US012753732B2

(12) United States Patent

Chiera et al.

(10) Patent No.: US 12,753,732 B2
(45) Date of Patent: Oct. 6, 2026

(54) MULTI-BARREL EXHAUST GAS RECIRCULATION MIXER

(71) Applicant: Woodward, Inc., Fort Collins, CO (US)

(72) Inventors: Domenico Chiera, Fort Collins, CO (US); Dan Mastbergen, Fort Collins, CO (US); Clayton Jacobs, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 19/192,715

(22) Filed: Apr. 29, 2025

(65) Prior Publication Data

US 2025/0389239 A1 Dec. 25, 2025

Related U.S. Application Data

(60) Provisional application No. 63/662,681, filed on Jun. 21, 2024.

(51) Int. Cl.
*F02M 26/13* (2016.01)
*F02M 26/00* (2016.01)
(Continued)

(52) U.S. Cl.
CPC ............ *F02M 26/13* (2016.02); *F02M 26/05* (2016.02); *F02M 26/10* (2016.02); *F02M 2026/001* (2016.02)

(58) Field of Classification Search
None
See application file for complete search history.

(56) References Cited

U.S. PATENT DOCUMENTS 6,267,106 B1 * 7/2001 Feucht .................... F02M 26/19 123/568.17
6,502,397 B1 * 1/2003 Lundqvist .............. F02M 26/70 60/605.1

(Continued)

FOREIGN PATENT DOCUMENTS

AT 525743 B1 7/2023
CN 101187348 A * 5/2008 ....... F02M 35/10216

(Continued)

OTHER PUBLICATIONS

International Search Report, International Searching Authority, International Patent Application No. PCT/US2025/028599, Jul. 15, 2025, 3 pages.

(Continued)

*Primary Examiner* — Kevin R Steckbauer
(74) *Attorney, Agent, or Firm* — Taft Stettinius & Hollister LLP

(57) ABSTRACT

An exhaust gas recirculation mixer according to certain embodiments is operable to receive a first fluid via a first fluid intake and to receive a second fluid via a second fluid intake. One of the first fluid or the second fluid comprises air, and the other of the first fluid or the second fluid comprises exhaust gas. The exhaust gas recirculation mixer generally includes a plurality of mixing passages and a plurality of multi-path nozzles. Each mixing passage includes a corresponding and respective throat. Each multi-path nozzle generally includes an outer nozzle fluidically connected to the first fluid intake, and an inner nozzle fluidically connected to the second fluid intake. The inner nozzle is nested within the outer nozzle and projects into the throat of a corresponding and respective mixing passage.

20 Claims, 20 Drawing Sheets

(51) Int. Cl.
*F02M 26/05* (2016.01)
*F02M 26/10* (2016.01)

(56) References Cited

U.S. PATENT DOCUMENTS

| | | | | |
|---|---|---|---|---|
| 6,609,373 | B2 * | 8/2003 | Coleman | F02M 26/05 60/605.1 |
| 6,659,092 | B2 * | 12/2003 | Coleman | F02M 26/70 123/568.17 |
| 6,748,741 | B2 * | 6/2004 | Martin | F02M 35/022 60/599 |
| 6,886,544 | B1 * | 5/2005 | Bui | F02M 26/21 123/568.24 |
| 7,281,530 | B2 * | 10/2007 | Usui | F02M 26/36 60/319 |
| 7,353,811 | B2 * | 4/2008 | Weisz | F02M 35/10222 123/568.21 |
| 7,426,923 | B2 * | 9/2008 | Berggren | F02M 26/19 123/568.17 |
| 7,552,722 | B1 * | 6/2009 | Shieh | F02M 26/19 60/602 |
| 7,798,135 | B2 * | 9/2010 | Bischofberger | F02M 35/10118 123/568.17 |
| 7,833,301 | B2 * | 11/2010 | Schindler | F02M 35/10013 95/32 |
| 9,051,900 | B2 * | 6/2015 | Teng | F02M 35/10262 |
| 10,316,803 | B2 * | 6/2019 | Hampson | F02M 26/05 |
| 10,465,637 | B2 * | 11/2019 | Beyer | F02M 35/10222 |
| 10,634,099 | B2 * | 4/2020 | Hampson | F02M 26/10 |
| 10,995,705 | B2 * | 5/2021 | Mastbergen | F01M 13/021 |
| 11,215,132 | B1 * | 1/2022 | Han | F02D 41/0002 |
| 11,268,421 | B2 * | 3/2022 | Williges | F01N 3/035 |
| 11,293,382 | B2 * | 4/2022 | Mastbergen | F02M 26/19 |
| 11,686,278 | B2 * | 6/2023 | Chiera | F02M 26/10 60/605.2 |
| 12,338,992 | B2 * | 6/2025 | Taylor | F23C 9/006 |
| 2004/0173192 | A1 * | 9/2004 | Sorter | F02M 26/19 123/568.18 |
| 2005/0183704 | A1 * | 8/2005 | Usui | F02M 26/36 123/568.17 |
| 2006/0124116 | A1 * | 6/2006 | Bui | F02M 26/10 60/278 |
| 2007/0199549 | A1 * | 8/2007 | Weisz | F02M 26/71 60/605.2 |
| 2008/0066725 | A1 * | 3/2008 | Berggren | F02M 26/19 123/568.18 |
| 2009/0120066 | A1 * | 5/2009 | VanderGriend | F01N 3/30 60/285 |
| 2011/0265772 | A1 * | 11/2011 | Teng | F02M 26/05 123/568.11 |
| 2014/0238364 | A1 * | 8/2014 | Beyer | F02M 26/05 123/568.21 |
| 2014/0373819 | A1 | 12/2014 | Gerty | |
| 2015/0267650 | A1 * | 9/2015 | Siuchta | F02M 21/0215 60/274 |
| 2016/0281650 | A1 * | 9/2016 | Roth | F02M 26/19 |
| 2017/0306899 | A1 * | 10/2017 | Sanami | F02M 26/17 |
| 2019/0093604 | A1 * | 3/2019 | Hampson | F02M 21/047 |
| 2020/0256266 | A1 * | 8/2020 | Mastbergen | F02D 41/0002 |
| 2021/0207560 | A1 * | 7/2021 | Mastbergen | F02M 26/19 |
| 2021/0340935 | A1 * | 11/2021 | Mccarthy | B01F 23/10 |
| 2022/0136465 | A1 * | 5/2022 | Chiera | F02M 26/10 60/605.2 |
| 2025/0389238 | A1 * | 12/2025 | Chiera | F02M 26/19 |
| 2025/0389239 | A1 * | 12/2025 | Chiera | F02M 26/13 |
| 2025/0389241 | A1 * | 12/2025 | Chiera | F02M 35/10216 |

FOREIGN PATENT DOCUMENTS

| | | | | | |
|---|---|---|---|---|---|
| CN | 103397959 | A | * | 11/2013 | |
| CN | 203335295 | U | * | 12/2013 | |
| CN | 207920739 | U | * | 9/2018 | F02M 26/05 |
| CN | 112211757 | A | | 1/2021 | |
| CN | 213175878 | U | * | 5/2021 | F02M 26/19 |
| CN | 116670385 | A | * | 8/2023 | F02M 26/10 |
| CN | 121184270 | A | * | 12/2025 | |
| CN | 116670385 | B | * | 2/2026 | F02M 26/42 |
| EP | 1826391 | A2 | * | 8/2007 | F02D 9/18 |
| EP | 2128394 | A2 | * | 12/2009 | B01D 46/4281 |
| GB | 2356223 | A | * | 5/2001 | F02M 26/19 |
| JP | H11324812 | A | * | 11/1999 | |
| JP | 6051881 | B2 | * | 12/2016 | |
| KR | 20080093982 | A | * | 10/2008 | F02M 35/10 |
| WO | WO-2008046987 | A2 | * | 4/2008 | F02M 35/10 |
| WO | WO-2025264328 | A1 | * | 12/2025 | F02M 26/10 |

OTHER PUBLICATIONS

Written Opinion of the International Searching Authority, International Searching Authority, International Patent Application No. PCT/US2025/028599, Jul. 15, 2025, 9 pages.

Non-Final Office Action, U.S. Patent and Trademark Office, U.S. Appl. No. 19/192,602, filed Jul. 1, 2025, 9 pages.

* cited by examiner

MULTI-BARREL EXHAUST GAS RECIRCULATION MIXER

CROSS-REFERENCE TO RELATED APPLICATIONS

The present application claims priority to U.S. Provisional Patent Application No. 63/662,681, filed Jun. 21, 2024, the contents of which are hereby incorporated by reference in their entirety.

TECHNICAL FIELD

The present disclosure generally relates to exhaust gas recirculation, and more particularly but not exclusively relates to modules and methods for exhaust gas recirculation.

BACKGROUND

Exhaust gas recirculation (EGR) mixers are commonly utilized with combustion engines to recirculate exhaust gas from the engine to the engine intake. Certain existing architectures exhibit specific operating characteristics. For example, many configurations include a single turbo with a wastegate. Such systems typically exhibit a relatively low turbine inlet pressure at low engine speeds, and relatively high turbine inlet pressure at high engine speeds. Configurations of this type can pose challenges for EGR drivability at low engine speeds. To address these challenges, certain existing solutions provide a combination of reed valves and an EGR module to enhance the EGR rate at low speeds. While some such solutions can improve EGR performance at low speeds, these same solutions can result in increased pressure drop (ΔP) across the EGR module during full power operation.

At maximum power and high engine speeds, the need for additional EGR suction is reduced, as the existing turbocharger area restriction creates a pressure drop upstream of the turbine, and manifold absolute pressure (MAP) is sufficient to drive the EGR flow. Certain existing EGR modules may create the suction to drive EGR at peak torque at low engine speeds, but present challenges during operation at high engine speed and high power. More particularly, the EGR module may provide passive flow resistance with results of efficiency penalty for engine performance. Moreover, the high ΔP across the engine prevents good breathing. This can cause retention of hot burned gas residuals, which in turn promote the very knocking combustion the EGR may be missioned to suppress. For these reasons among others, there remains a need for further improvements in this technological field.

SUMMARY

An exhaust gas recirculation mixer according to certain embodiments is operable to receive a first fluid via a first fluid intake and to receive a second fluid via a second fluid intake. One of the first fluid or the second fluid comprises air, and the other of the first fluid or the second fluid comprises exhaust gas. The exhaust gas recirculation mixer generally includes a plurality of mixing passages and a plurality of multi-path nozzles. Each mixing passage includes a corresponding and respective throat. Each multi-path nozzle generally includes an outer nozzle fluidically connected to the first fluid intake, and an inner nozzle fluidically connected to the second fluid intake. The inner nozzle is nested within the outer nozzle and projects into the throat of a corresponding and respective mixing passage. Further embodiments, forms, features, and aspects of the present application shall become apparent from the description and figures provided herewith.

DETAILED DESCRIPTION OF ILLUSTRATIVE EMBODIMENTS

Figure 1:
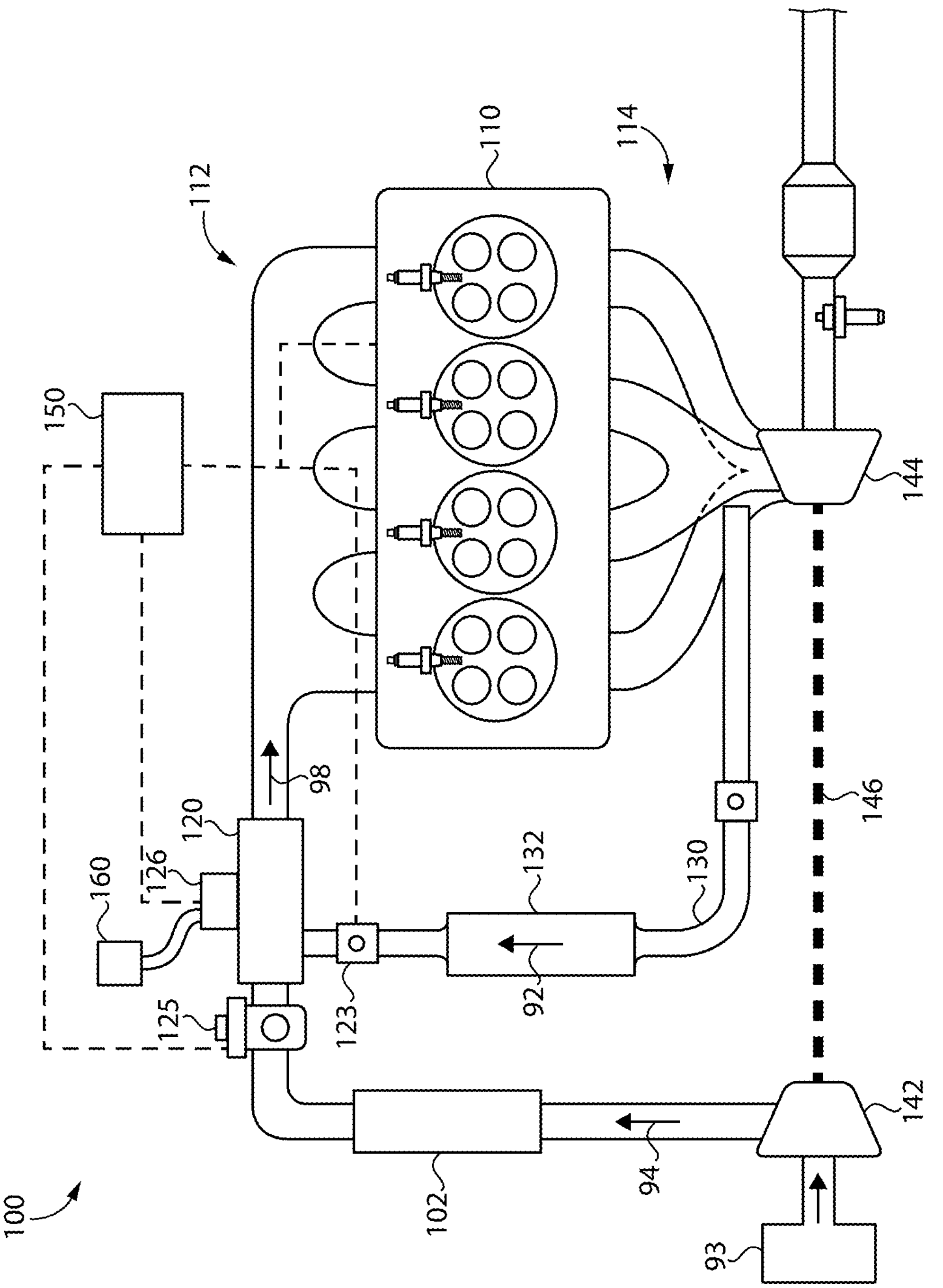
FIG. 1 is a schematic representation of an engine system according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is an example engine system 100. The engine system 100 includes an intake manifold 112 configured to direct a mixture to be combusted toward a combustion chamber of an engine 110. That is, the intake manifold 112 is fluidically coupled to a source of oxygen and a source of fuel. The combustible mixture can include air and any combustible fluid, such as natural gas, atomized gasoline, or diesel. While the illustrated implementation includes a four-cylinder engine 110, any number of cylinders can be used. Also, while the illustrated implementation includes a piston engine 110, various aspects of this disclosure can be applied to other types of internal combustion engines, such as rotary engines and/or gas turbine engines.

An air throttle 125 is positioned upstream of the intake manifold 112. The air throttle 125 is configured to at least partially or entirely regulate an air flow into an exhaust gas recirculation (EGR) mixer 120 from the ambient environment 93, for example, by changing a cross-sectional area of a flow passage through the air throttle 125. In some implementations, the air throttle 125 can include a butterfly valve or a disc valve. Reducing the cross-sectional area of the flow passage through the air throttle 125 reduces the flowrate of air 94 flowing through the air throttle 125 towards the intake manifold 112.

An exhaust manifold 114 is configured to receive combustion products (exhaust) from a combustion chamber of the engine 110. That is, the exhaust manifold 114 is fluidically coupled to an outlet of a combustion chamber of the engine 110. An EGR flow passage 130 fluidically connects the exhaust manifold 114 and the intake manifold 112 via the EGR mixer 120. In the illustrated implementation, an EGR throttle valve 123 is located within the EGR flow passage 130 between the exhaust manifold 114 and the intake manifold 112, and is used to regulate the EGR flow. The EGR throttle valve 123 regulates the EGR flow by adjusting a cross-sectional area of the EGR flow passage 130 through the EGR throttle valve 123. In some implementations, the EGR throttle valve 123 can include a butterfly valve, a disc valve, a needle valve, a globe valve, or another style of valve.

The EGR flow passage 130 feeds into the EGR mixer 120, which in the illustrated embodiment is located downstream of the air throttle 125 and upstream of the intake manifold 112. The EGR mixer 120 is fluidically connected to the air throttle 125, the intake manifold 112, and the EGR flow passage 130. The fluid connections can be made with conduits containing flow passages that allow fluid flow. In some implementations, the EGR mixer 120 can be included within a conduit connecting the intake manifold 112 to the air throttle 125, within the intake manifold 112 itself, within the EGR flow passage 130, integrated within the air throttle 125, or integrated into the EGR throttle valve 123. Provided herein are further details regarding an example EGR mixer 200 that may be utilized as the EGR mixer 120.

In some implementations, an exhaust gas cooler 132 is positioned in the EGR flow passage 130 between the exhaust manifold 114 and the EGR mixer 120. The exhaust gas cooler 132 can operate to lower a temperature of the exhaust gas 92 prior to the EGR mixer 120. The exhaust gas cooler 132 can be heat exchanger, such as an air-air exchanger or an air-water exchanger. In some implementations, the exhaust gas cooler 132 is not included.

In some implementations, the engine system 100 includes a compressor 142 upstream of the air throttle 125. In an engine with a compressor 142 but no air throttle, such as an un-throttled diesel engine, the air throttle 125 is not needed and the mixer 120 can be downstream of the compressor 142. The compressor 142 can include a centrifugal compressor, a positive displacement compressor, or another type of compressor for increasing a pressure within the intake manifold 112 during engine operation.

In some implementations, the engine system 100 can include an intercooler 102 that is configured to cool the compressed air 94 prior to the air 94 entering the manifold. In the illustrated implementation, the compressor 142 is a part of a turbocharger. That is, a turbine 144 is located downstream of the exhaust manifold 114 and rotates as the exhaust gas 92 expands through the turbine 144. The turbine 144 is coupled to the compressor 142, for example, via a shaft 146, and imparts rotation on the compressor 142. In the illustrated implementation, the turbine 144 also increases a back-pressure within the exhaust manifold 114, thereby increasing the pressure within the EGR flow passage 130. While the illustrated implementation utilizes a turbocharger to increase the pressure within the intake manifold 112, other methods of compression can be used, such as an electric or engine powered compressor (e.g., supercharger). In some implementations, a separate controller 150 or engine control unit (ECU) is used to control various aspects of the system operation. For example, the controller 150 can adjust air-fuel ratios, spark timing, and EGR flow rates based on current operating conditions.

In the illustrated form, a fuel pump 126 is fluidically coupled to a fuel reservoir 160, and is operable to inject fuel into the EGR mixer 120, for example under control of the controller 150. As such, the illustrated EGR mixer 120 provides an output mixture 98 including exhaust gas 92, air 94, and fuel 96. It is also contemplated that the fuel 96 may not necessarily be mixed with the exhaust gas 92 and air 94 within the EGR mixer 120. For example, in certain embodiments, fuel 96 is not provided to the EGR mixer 120, and is instead injected into the flow downstream of the EGR mixer 120, such as directly into the engine 110. Moreover, it should be appreciated that the fuel pump 126 may be omitted in certain embodiments. For example, an embodiment of the system 100 in which the fuel 96 is natural gas, the fuel 96 may already be at the correct pressure such that a fuel pump 126 is not required.

A variation of the exhaust manifold 114 may include a "split manifold" design, especially for "symmetric" configurations of the engine 110. For example, on a 6-cylinder engine, the split manifold may separate a sequence of cylinders 1, 2, and 3 to accept pulsing exhaust blow-down gases without overlap in time, thus creating a steady standing pressure pulse. The split manifold may operate similarly for the other half of the cylinders (e.g., cylinders 4, 5, and 6). The split manifold design may avoid pulse overlap and wave cancelling. In certain embodiments, the split manifold may be retained to be plumbed into two parallel EGR paths each with its own EGR cooler and compatible with reed valves. In certain forms, the EGR plumbing is configured to enable the pulsing flow to drive a positive velocity EGR flow with minimal to no restrictions. In certain embodiments, the junction at the exhaust manifold includes a "Total Pressure" recovery junction, which directs in-line the EGR flow into the EGR plumbing without slowing it down or forcing it to turn 90°, as with most conventional EGR take-off junctions.

Figure 2:
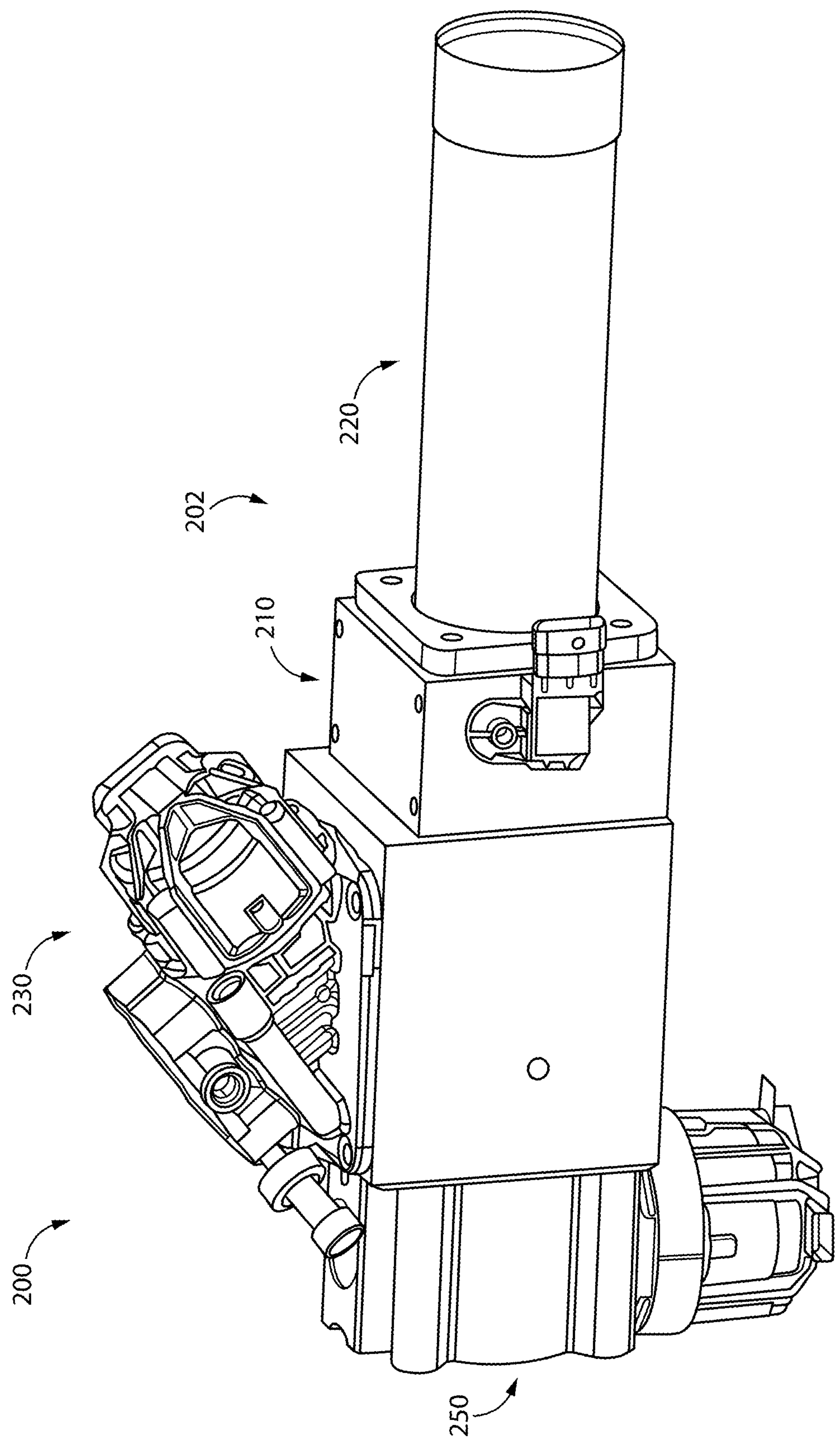
FIG. 2 is a perspective illustration of an EGR mixer according to certain embodiments.
Figure 3:
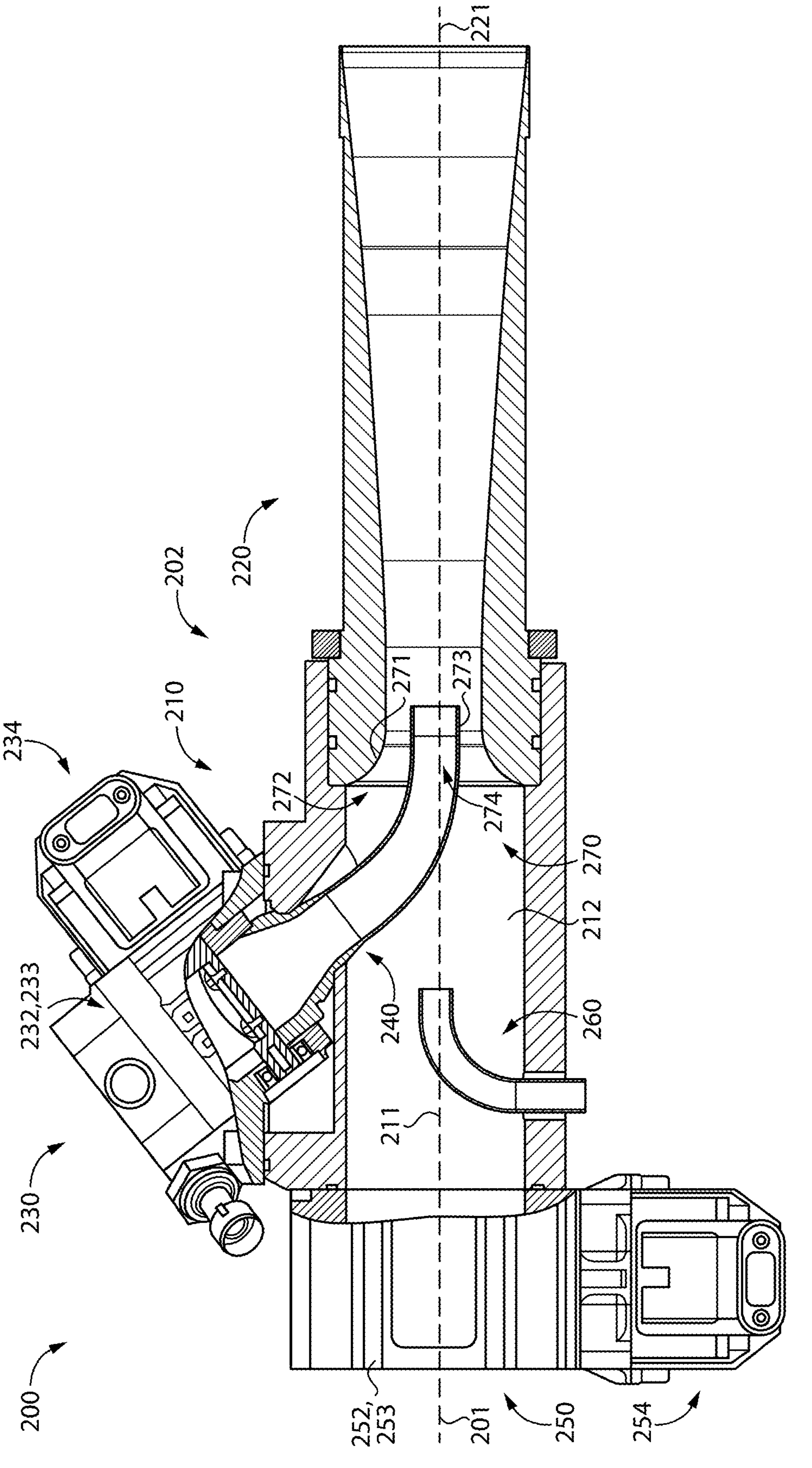
FIG. 3 is a cross-sectional illustration of the EGR mixer illustrated in FIG. 2.

With additional reference to FIGS. 2 and 3, illustrated therein is an example embodiment of an EGR mixer 200, which may be utilized in the engine system 100 as the EGR mixer 120. In the illustrated form, the EGR mixer 200 is provided as a modular construct, and may alternatively be referred to herein as the EGR module 200. However, it should be appreciated that the concepts described herein need not be provided in a modular construct, and may instead be integrated into a system such as the engine system 100 in another manner.

Figure 16:
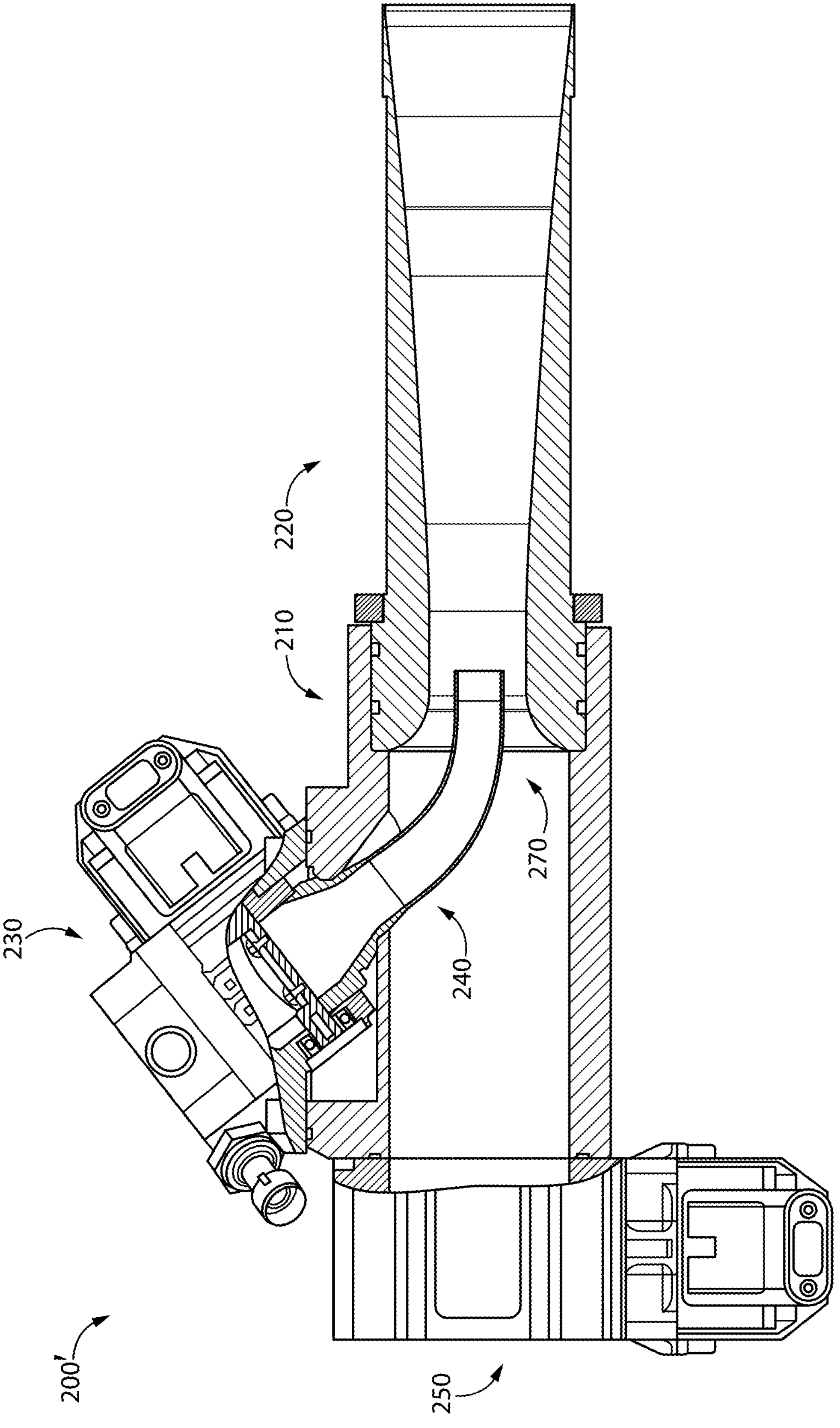
FIG. 16 illustrates a variation of the EGR mixer illustrated in FIG. 2 in which the fuel injection nozzle is omitted.

The illustrated EGR module 200 generally includes a housing 202, which in the illustrated form includes a case 210 and a mixing tube 220, an EGR intake 230 fluidically connected with an EGR nozzle 240 via an EGR control valve 232, and an air intake 250 fluidically connected with a chamber 212 of the case 210 via an air control valve 252. The air intake 250 may, for example, receive air 94 to be introduced to the chamber 212 from the compressor 142. In certain embodiments, the EGR module 200 further includes a fuel nozzle 260 for injecting fuel 96 into the chamber 212. It is also contemplated that the fuel nozzle 260 may be omitted, for example in embodiments in which fuel is to be injected into the flow path upstream or downstream of the EGR module 200. FIG. 16 illustrates an embodiment of an EGR module 200' in which the fuel nozzle 260 is omitted.

As described herein, the EGR module 200 may be considered to include a multi-path nozzle 270 that provides at least two distinct flow paths (e.g., an outer flow path 272 and an inner flow path 274) to a throat 226 of the mixing tube 220. The illustrated EGR module 200 includes a first fluid intake 250 connecting the outer flow path 272 to a supply of a first fluid, and a second fluid intake 230 connecting the inner flow path 274 to a supply of a second fluid. In the illustrated form, the first fluid intake 250 is an air intake that directs air 94 to the outer flow path 272, and the second fluid intake 230 is an EGR intake that directs exhaust gas 92 to the inner flow path 274. It is also contemplated that this arrangement may be reversed. For example, the first fluid intake 250 may instead be an EGR intake that directs exhaust gas 92 to the outer flow path 272, and the second fluid intake 230 may instead be an air intake that directs air 94 to the inner flow path 274.

The housing 202 generally extends along and defines a longitudinal axis 201 of the EGR module, and as noted above, includes a case 210 and a mixing tube 220. The case 210 extends along and defines a case longitudinal axis 211, which in the illustrated form is coincident with the longitudinal axis 201 of the EGR module 200. The case 210 also defines the chamber 212, which in the illustrated form receives air 94 from the air intake 250, and which in at least certain embodiments receives fuel 96 from the fuel nozzle 260.

Figure 4:
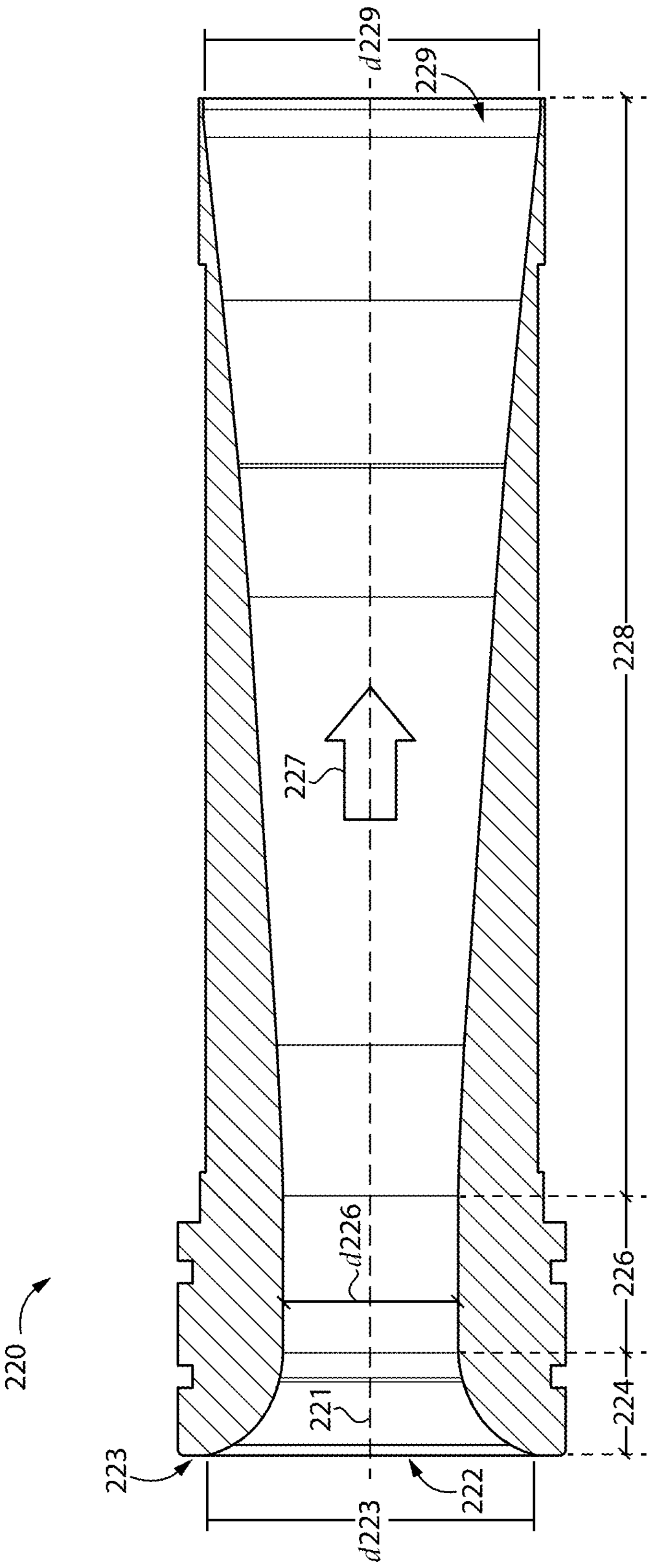
FIG. 4 is a cross-sectional illustration of a mixing tube according to certain embodiments.
Figure 5:
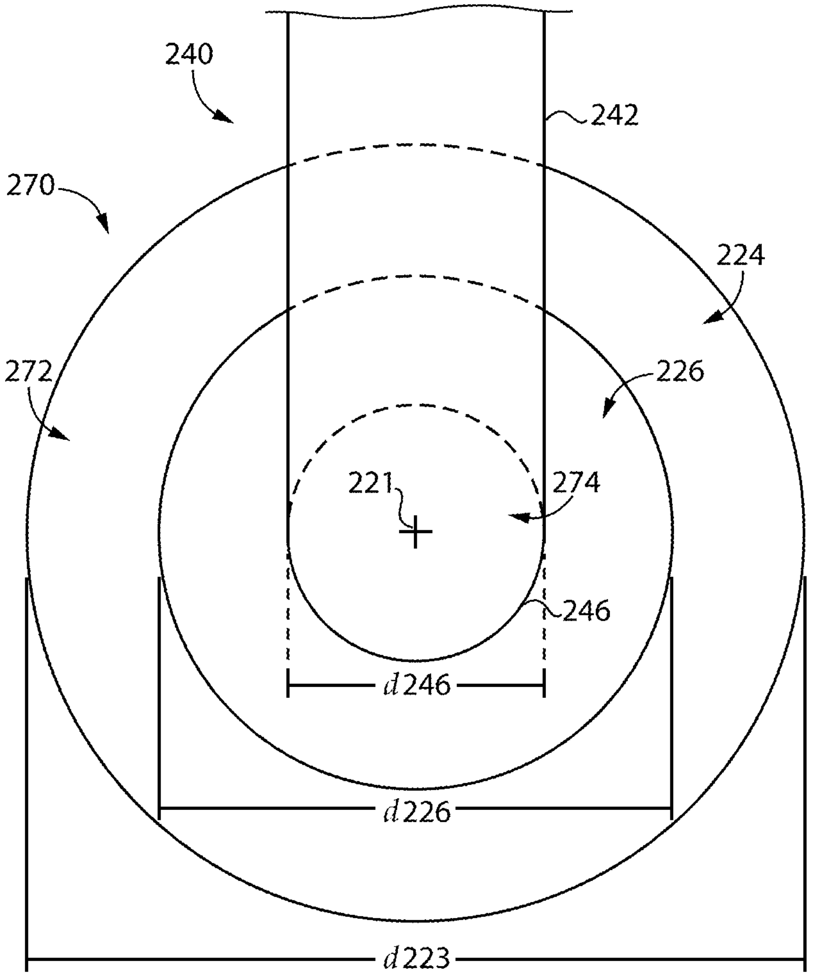
FIG. 5 is a schematic representation of a multi-path nozzle according to certain embodiments.

With additional reference to FIGS. 4 and 5, the mixing tube 220 extends along and defines a mixing tube longitudinal axis 221 that defines a bulk flow direction 227 within the mixing tube 220, and which in the illustrated form is coincident with the case longitudinal axis 211 to thereby define the EGR module longitudinal axis 201. It is also contemplated that the mixing tube longitudinal axis 221 may be offset from the case longitudinal axis 211. The mixing tube 220 defines a passage 222, which extends along the longitudinal axis 221 in the bulk flow direction 227 from the chamber 212. The passage 222 generally includes a converging portion 224, a throat 226 downstream of the converging portion 224, and a diverging portion 228 downstream of the throat 226.

The converging portion 224 converges from an inlet location 223 adjacent the chamber 212 to the throat 226 such that the diameter of the passage 222 reduces from an inlet diameter d223 to a throat diameter d226 less than the inlet diameter d223. The converging portion 224 thus serves as a Bernoulli nozzle for directing fluid into the throat 226, and may alternatively be referred to as the outer nozzle 271 of the multi-path nozzle 270. As described herein, the converging portion 224 cooperates with a portion of the EGR nozzle 240 to define the first or outer flow path 272 as a substantially annular flow path. The throat 226 defines the narrowest portion of the passage 222, and may have a relatively constant throat diameter d226. The diverging portion 228 diverges from the throat 226 to an outlet 229 such that the diameter of the passage 222 increases from the throat diameter d226 to an outlet diameter d229 greater than the throat diameter d226. As described herein, the illustrated diverging portion 228 is provided as a diffuser configured to reduce the velocity of the fluid flowing therethrough while increasing the static pressure of the fluid, and may alternatively be referred to herein as the diffuser 228.

The EGR intake 230 is fluidically connected to the EGR conduit 130 such that the EGR nozzle 240 is operable to receive exhaust gas 92 from the exhaust manifold 114. In the illustrated form, the EGR intake 230 includes an EGR control valve 232 corresponding to the above-described EGR throttle 123, and an actuator 234 operable to control the EGR control valve 232. In the illustrated form, the EGR control valve 232 is provided in the form of a butterfly valve 233. While it is also contemplated that the EGR control valve 232 may be provided in another form, such as the more conventional poppet valve, it has been found that a butterfly valve 233 may present certain advantages over the poppet valve. For example, it has been found that a poppet valve can reduce the flow rate of the gas passing therethrough, which can cause the flow to stagnate. By contrast, a butterfly valve 233 can be set to a wide-open state in which the butterfly valve 233 provides little to no resistance to the flow of gas therethrough.

Figure 6:
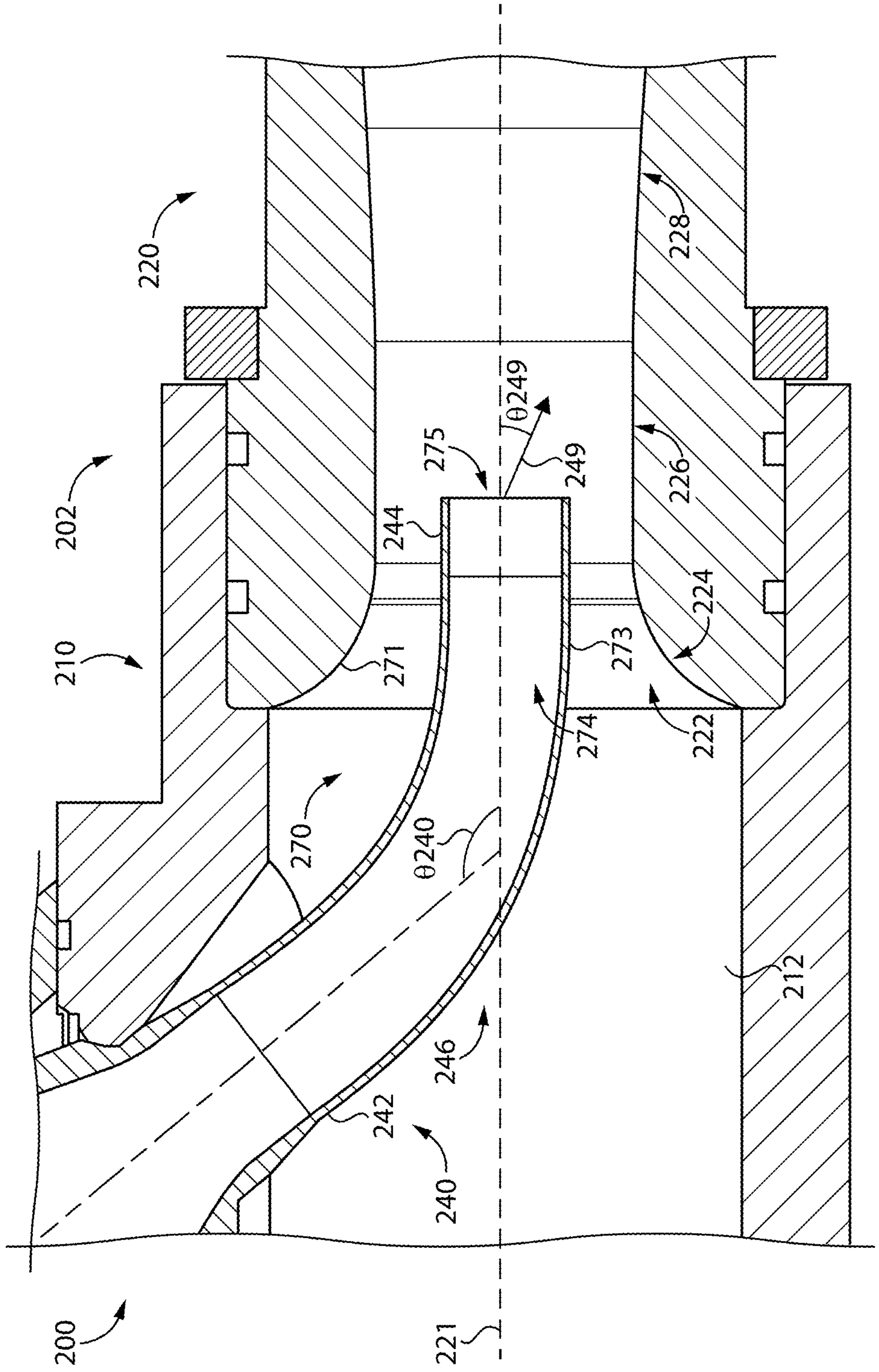
FIG. 6 is a cross-sectional view illustrating the multi-path nozzle within the EGR mixer.

With additional reference to FIG. 6, the EGR nozzle 240 extends into the chamber 212, and in the illustrated form extends into the passage 222 of the mixing tube 220. The illustrated EGR nozzle 240 generally includes an inlet portion 242 that receives exhaust gas 92 from the EGR intake 230, and an outlet portion 244 from which exhaust gas 92 is discharged into the passage 222. The outlet portion 244 may alternatively be referred to herein as the inner nozzle 273 of the multi-path nozzle 270, and at least partially defines each of the first flow path 272 and the second flow path 274.

In the illustrated form, the EGR nozzle 240 further includes a curved portion 246 that provides a smooth transition between the inlet portion 242 and the outlet portion 244. The inlet portion 242 extends into the chamber 212 at an angle, and the outlet portion 244 extends generally along the mixing tube longitudinal axis 221. The inlet portion 242 and the outlet portion 244 define an included angle θ240, which in the illustrated form is an obtuse included angle. While the included angle θ240 of the illustrated EGR nozzle 240 is about 130°, it should be appreciated that the included angle θ240 may take another value.

The EGR nozzle 240 is configured to discharge the exhaust gas 92 in an EGR nozzle discharge direction 249 that generally aligns with the bulk flow direction 227, which in turn is aligned with the mixing tube longitudinal axis 221. In FIG. 5, the EGR nozzle discharge direction 249 is illustrated as being angularly offset from the mixing tube longitudinal axis 221 by an offset angle θ249. In certain embodiments, the offset angle θ249 is less than 10°, less than 7.5°, less than 5°, or less than 2.5°. In certain embodiments, the nozzle discharge direction 249 may fully align with the mixing tube longitudinal axis 221 such that the offset angle θ249 is zero.

Figure 7:
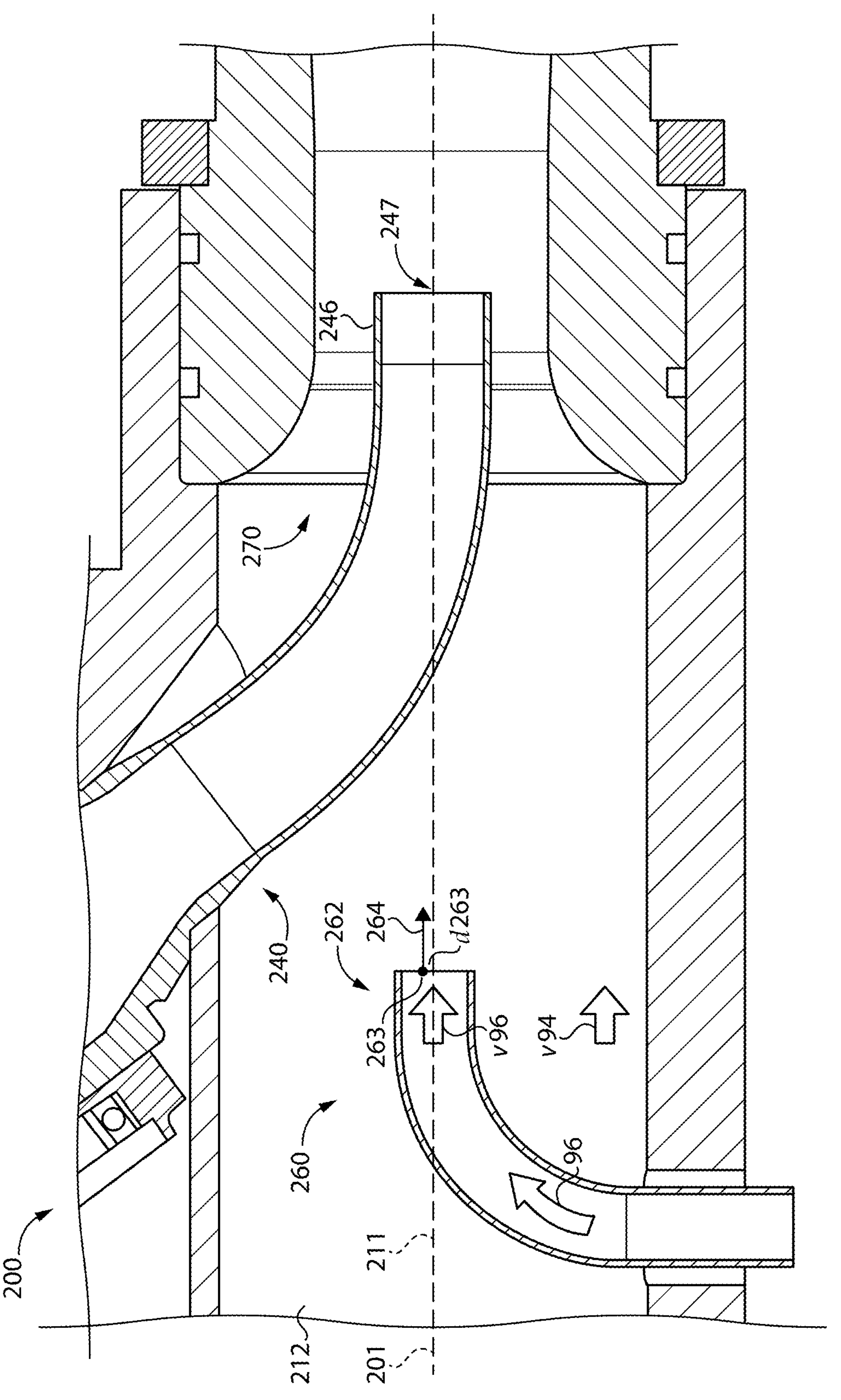
FIG. 7 is a cross-sectional illustration of a portion of the EGR mixer, and illustrates a fuel nozzle positioned upstream of a multi-path nozzle.

With additional reference to FIG. 7, in the illustrated form, the fuel nozzle 260 is positioned upstream of the EGR nozzle 240, and is configured to discharge fuel 96 in a fuel discharge direction 269. In the illustrated embodiment, the fuel discharge direction 269 is parallel to the case longitudinal axis 211. In other embodiments, the fuel discharge direction 269 may be substantially parallel to the case longitudinal axis 211. For example, the fuel discharge direction 269 and the case longitudinal axis 211 may be within 10° of parallel, within 7.5° of parallel, within 5° of parallel, or within 2.5° of parallel. It should be appreciated that, as used herein, the term "at least substantially parallel" encompasses and includes both parallel and substantially parallel.

The fuel nozzle 260 includes an outlet portion 262 having a center 263 that is near to or coincident with the mixing tube longitudinal axis 221. In certain embodiments, the center 263 of the outlet portion 262 is offset from the mixing tube longitudinal axis 221 by an offset distance d263, which is preferably less than 10% of the throat diameter d262. For example, the offset distance d263 may be about 7.5 mm or less. In certain forms, the offset distance d263 is less than 8% of the throat diameter d262, less than 6% of the throat diameter d262, or less than 4% of the throat diameter d262. In certain forms, the offset distance d263 at least than 1% of the throat diameter d262, at least 2% of the throat diameter d262, or at least 3% of the throat diameter d262. In the illustrated form, the offset distance d263 is measured between the center 263 of the outlet portion 262 and the mixing tube longitudinal axis 221. It is also contemplated that the offset distance d263 may be measured between the center 263 of the fuel nozzle outlet portion 262 and the center 247 of the EGR nozzle outlet portion 244. In such forms, the offset distance d263 (measured between the center 263 of the fuel nozzle outlet portion 262 and the center 247 of the EGR nozzle outlet portion 244) may take any of the values listed above.

In certain forms, the flow of fuel 96 may be provided at a desired velocity v96 relative to the velocity v94 of air 94 around the fuel nozzle 260. It has been found that advantageous mixing properties may be provided by providing a fuel/air velocity ratio of at least 0.4 (i.e., v96/v94>0.4).

As noted above, the multi-path nozzle 270 generally includes an inner nozzle 273 that defines an inner flow path 274 and an outer nozzle 271 that cooperates with the inner nozzle 273 to define an outer flow path 272. In the illustrated form, the inner nozzle 273 is defined by the outlet portion 244 of the EGR nozzle 240, and the outer nozzle 271 is defined by the converging portion 224 of the mixing tube 220. Additionally, the inner nozzle 273 projects into the throat 226 of the mixing passage 222, and in the illustrated form is concentric with each of the outer nozzle 271 and the throat 226.

Figure 8:
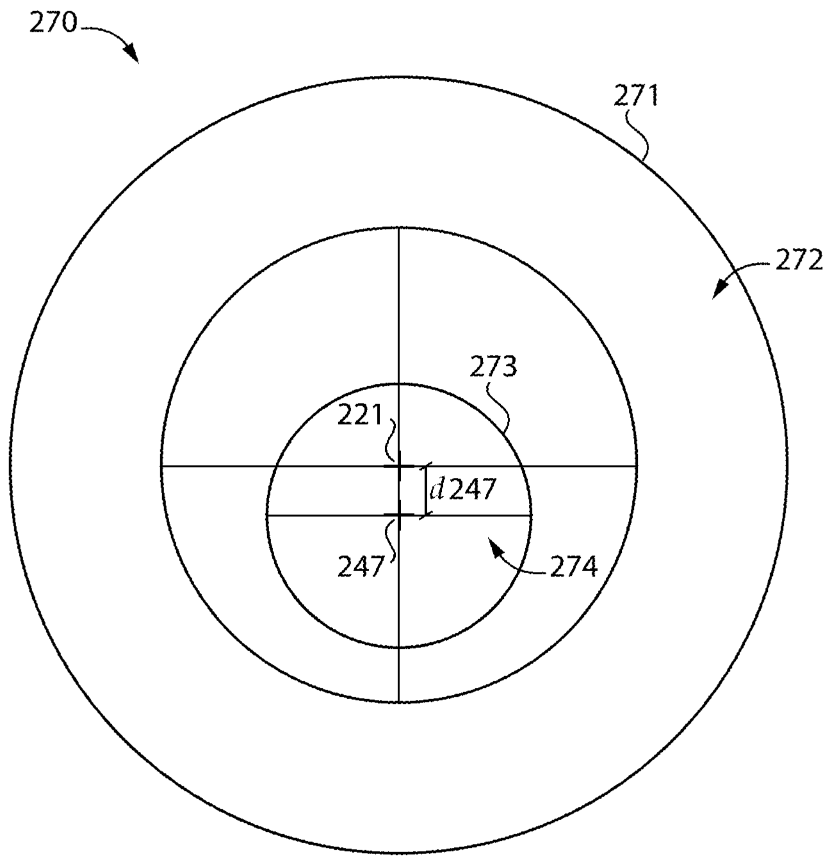
FIG. 8 is a schematic representation of substantially concentric geometries.

With additional reference to FIG. 8, it should be appreciated that the inner nozzle 273 may be substantially concentric with the outer nozzle 271 and/or substantially concentric with the throat 226. For example, the center 247 of the EGR nozzle outlet portion 244 may be offset from the mixing tube longitudinal axis 221 by a relatively small offset distance d247 such that the inner nozzle 273 is substantially concentric with the outer nozzle 271 and the throat 226. In certain embodiments, the term "substantially concentric" may be used to describe nested geometries when the offset distance d247 between the centers 221, 247 of the geometries is less than 10% the diameter of the larger geometry, less than 5% of the diameter of the larger geometry, or less than 2% the diameter of the larger geometry. In certain embodiments, the term "substantially concentric" may be used to describe nested geometries when the offset distance d247 between the centers 221, 247 of the geometries is less than 10% the diameter of the smaller geometry, less than 5% of the smaller of the larger geometry, or less than 2% the diameter of the smaller geometry. Moreover, the term "substantially annular" may be used describe the outer flow path 272 at least when the flow paths 272, 274 are "substantially concentric" as defined herein.

During operation of the EGR module 200, at least two fluids are provided to the mixing tube 220 via the multi-path nozzle 270 such that the fluids intermix within the mixing tube 220. More particularly, a first fluid (e.g., air 94) is delivered to the mixing tube 220 via a first flow path 272 of the multi-path nozzle 270, and a second fluid (e.g., exhaust gas 92) is delivered to the mixing tube 220 via a second flow path 274 of the multi-path nozzle 270. In the illustrated form, the air 94 is delivered via an outer flow path 272, and the exhaust gas 92 is delivered via the inner flow path 274. It is also contemplated that this arrangement may be reversed such that the air 94 is delivered via the inner flow path 274, and the exhaust gas 92 is delivered via an outer flow path 272. As described herein, in certain embodiments, the air 94 may be mixed with fuel 96 upstream of the multi-path nozzle 270.

Figure 9:
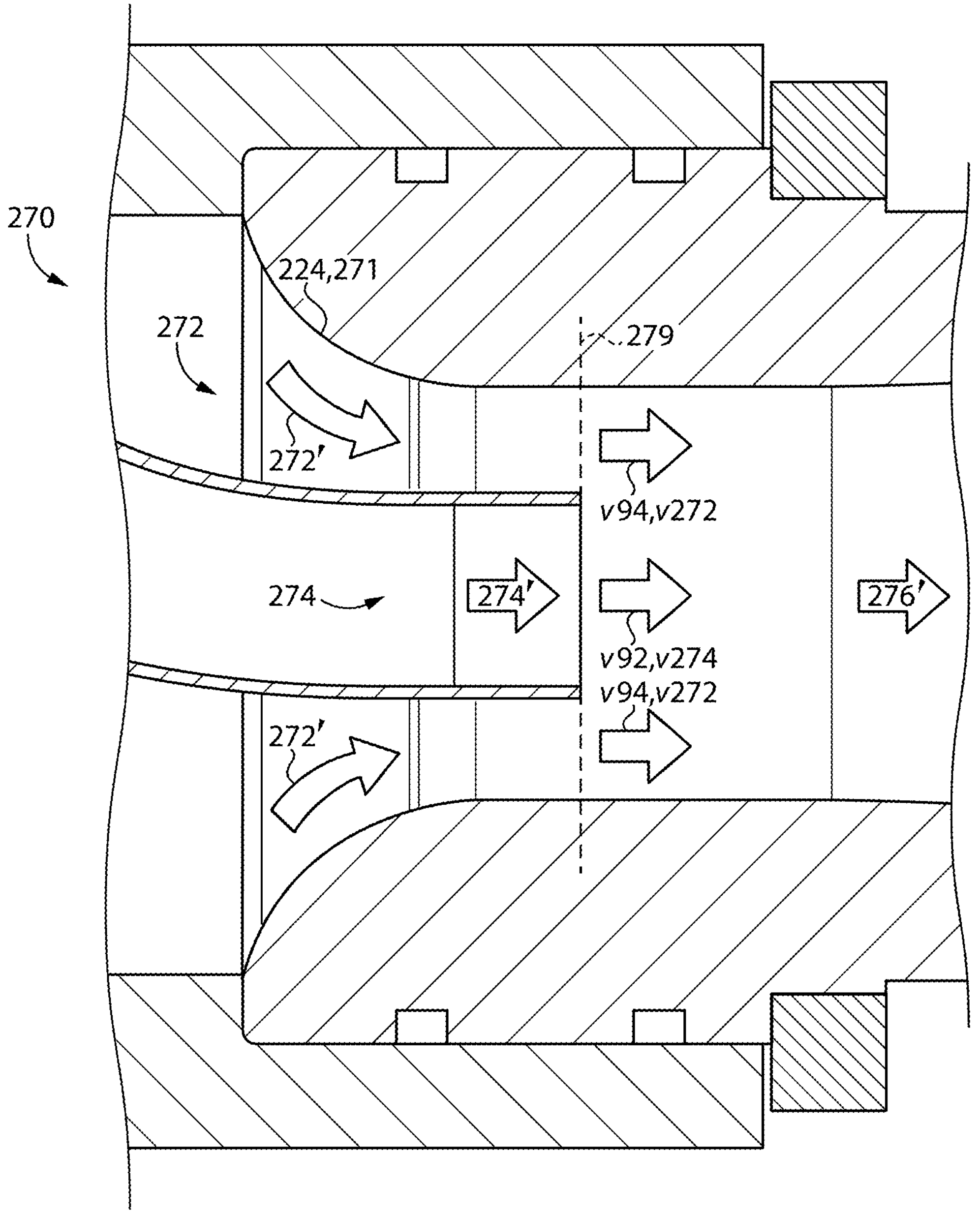
FIG. 9 is a cross-sectional illustration of the multi-path nozzle and a portion of the mixing tube.

With additional reference to FIG. 9, the fluid to be delivered via the outer flow path 272 (in the illustrated embodiment, air 94) enters the converging portion 224 of the mixing tube passage 222, which defines the Bernoulli nozzle 271 portion of the multi-path nozzle 270. As the effective flow area of the flow path 272 is reduced, the flow 272' accelerates, thereby increasing its velocity, which in turn reduces its static pressure via the Bernoulli principal. The static pressure achieved inside the outer nozzle 271 is then imposed at the exit 275 of the inner nozzle 273 via the jet phenomenon. This low static pressure is in turn imposed as the boundary condition for the EGR pathway. In certain embodiments, the EGR module 200 is designed specifically to provide the optimal pressure drop in the outer nozzle 271 to induce at the EGR outlet portion 244 a pressure that is below the static pressure of the exhaust manifold 114. In such forms, the ΔP across the EGR pathway is favorable to the flow of exhaust gas 92 from the exhaust manifold 114 to the mixing tube 220.

As the exhaust gas 92 enters the mixing tube 220, the exhaust gas 92 retains its velocity and momentum as a result of the configuration of the EGR module 200. This is in contrast to conventional systems, in which exhaust gas and air are provided to a mixing chamber in directions at least approaching the perpendicular. The velocity and momentum of the exhaust gas 92 then joins with the velocity and momentum of the air 94 provided along the outer flow path 272. The two flows 272', 274' create a shear/mixing layer which generates turbulence to thereby promote mixing within the throat 226. The two flows 272', 274', now combined as a single flow 276', exit the throat 226 of the mixing passage 222 together. The diverging section 228 provides an expansion zone, which in the illustrated form is specifically designed for pressure recovery by smoothly slowing the mixture flow 276'. This may, for example, be accomplished by smoothly increasing the cross-sectional area of the diverging section 228, which converts the velocity of the flow 276' back to static pressure, and the original pressure of the primary air flow is mostly recovered. The diverging section 228 may alternatively be referred to herein as the diffuser 228.

When the engine 110 is operating at low speeds with high power density (rated torque) and lower EGR flow requirements, the primary jet pump action comes from the flow of air 94, which creates suction for the EGR path. When the engine 110 is operating at high speed and power (max power), the EGR path is more energetic, as more EGR flow is required. Additionally, due to typical turbocharger physics, the exhaust turbine 144 tends to be more restrictive at high engine speed and power, thus the flow of exhaust gas 92 becomes the primary driver of the jet pump. This in turn creates suction for the flow of air 94, which now becomes the secondary flow. This can be an advantageous aspect, because in conventional jet pump systems, the air flow at high engine speed and power can often become restrictive.

The flow of air 94 may be controlled via an "over boost" command (pressure of the air before the throttle) which uses the turbocharger controls (waste gate or variable geometry turbocharger) combined with a throttle for air flow modulation as needed. In many cases, the throttle can be wide-open (WOT), and the engine air flow is modulated by the turbocharger boost control (waste gate or variable geometry turbocharger). The flow of exhaust gas 92 can be controlled via the EGR valve 232, which can attenuate or reduce the flow as needed.

In certain embodiments, various parameters of the system may be adjusted to control the ratio of exhaust gas 92 to air 94 (the EGR/AIR ratio) based upon the operating speed of the engine 110. For example, the controller 150 may control one or more valves (e.g., the air throttle 125, the EGR throttle 123, etc.) to provide the mixture 98 with a desired EGR/AIR ratio. As used herein, the term "EGR/AIR ratio" may be used to refer to the ratio of the mass flow rate of exhaust gas 92 to the mass flow rate of the air 94. In certain forms, the controller 150 may be configured to increase the EGR/AIR ratio in response to an increase in the operating speed of the engine 110. For example, at relatively low operating speeds, the EGR/AIR ratio may be relatively low, such as in a range of 10-15%. At relatively high operating speeds, the EGR/AIR ratio may be relatively high, such as 20-30% or higher.

Moreover, the system 100 may be controlled to provide a desired ratio of the speeds of the flows 272', 274' at the merge location 279 at which the flows 272', 274' merge. It has been found that providing the flows 272', 274' with particular relative velocities can advantageously promote mixing within the passage 222, particularly when the engine 110 is operating at peak power. Thus, in at least certain embodiments, the controller 150 may be configured to provide the flows 272', 274' with an EGR/AIR exit velocity ratio between 0.7 and 2.0. As used herein, the term "EGR/AIR exit velocity ratio" may be used to refer to the ratio obtained when the velocity v92 of the exhaust gas 92 at the merge location 279 is divided by the velocity v94 of the air 94 at the merge location 279.

As should be appreciated from the foregoing, flow of both air 94 and exhaust gas 92 is coupled, and the jet pump action enables relatively independent flow control of both. It is noted that if more air 94 is required, the controller 150 may reduce the turbine inlet area of the turbo, which generates more boost and also more back pressure, which in turn drives a higher EGR flow potential. In certain embodiments, the system 100 maintains the minimum possible "engine back pressure ΔP" to intake manifold pressure. This can reduce pumping work losses and hot-burned gas retention, which can in turn reduce knocking.

As noted above, in certain embodiments, the EGR module 200 may be provided with a fuel nozzle 260 through which fuel 96 may be injected into the chamber 212. In the illustrated form, the fuel nozzle 260 is positioned upstream of the multi-path nozzle 270. It has been found that injecting the fuel 96 upstream of the EGR nozzle 240 may provide one or more advantages. For example, the injection of fuel 96 into the charged air 94 upstream of the multi-path nozzle 270 creates a generally annular distribution of the fuel 96 about the EGR nozzle outlet portion 244. The fuel 96, entrained in air 94, is then introduced to the throat 226, in which the fluid flow exhibits high velocity and turbulence generated by the two flows 272', 274' merging at different speeds. It should be appreciated that the high turbulence promotes mixing of the fuel 96 with exhaust gas 92 and air 94.

In the illustrated form, the fuel 96 is injected with an offset d263 relative to the mixing tube axis 221. It has been found that such an offset d263 may improve the distribution of the fuel 96 about the EGR nozzle 240 in a more uniform manner. Indeed, it has been found that if fuel 96 is injected fully aligned with the central axis 221, the fuel 96 can tend to concentrate in the region below the EGR nozzle 240. As such, the offset configuration may optimize fuel dispersion and enhance mixing within the EGR module 200.

In the embodiment of an EGR module 200 illustrated in FIGS. 2-9, the mixing tube 220 defines a single mixing passage 222 that provides for mixing of exhaust gas 92 and air 94. Moreover, a single multi-path nozzle 270 is utilized to direct the fluids 92, 94 to the throat 226 of the mixing passage 222. It is also contemplated that an EGR module according to certain embodiments may include further mixing passages and a corresponding number of multi-path nozzles 270. An example of such an embodiment is described herein with reference to FIG. 10.

Figure 10:
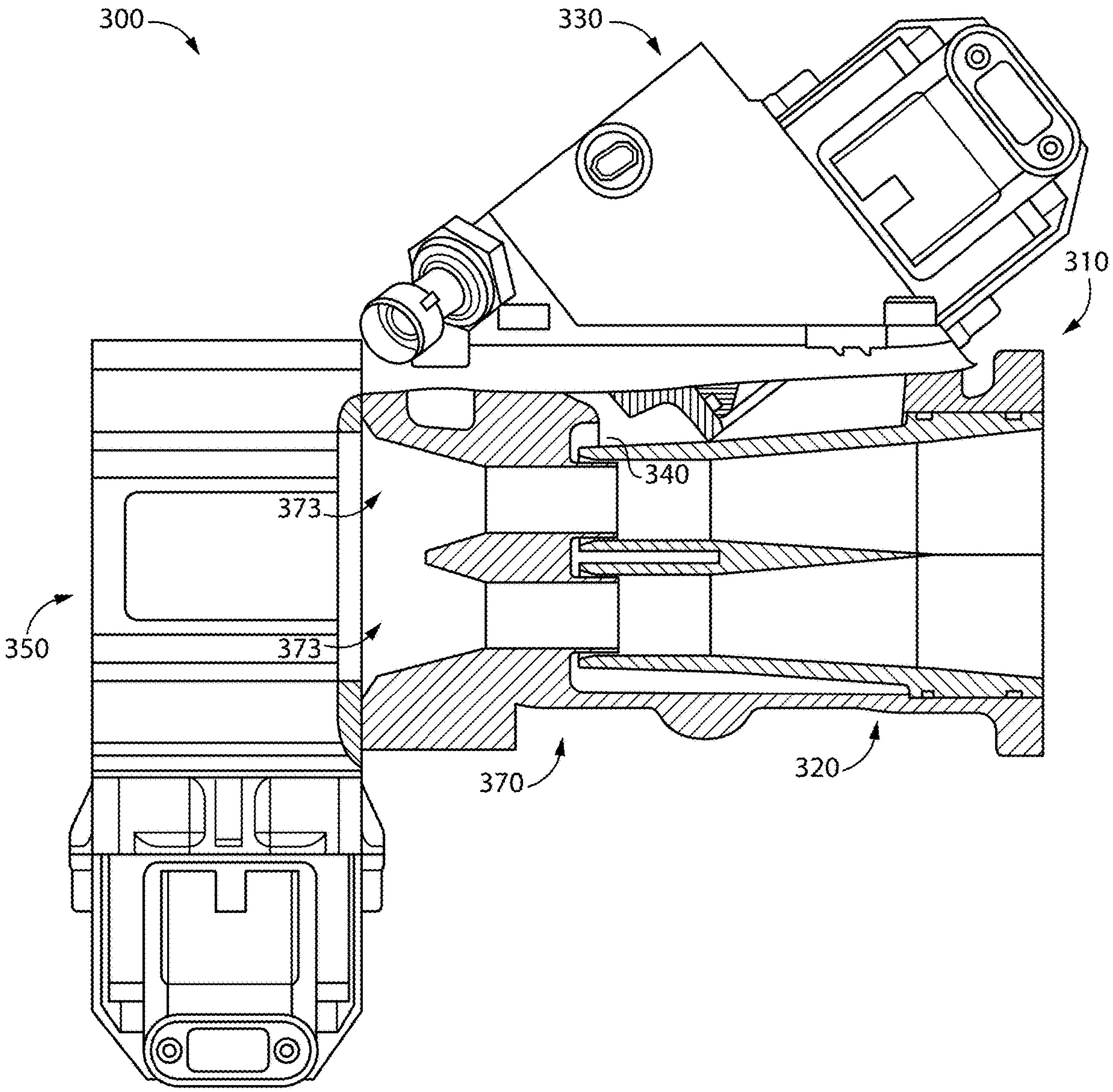
FIG. 10 is a cross-sectional illustration of a multi-barrel EGR mixer according to certain embodiments.
Figure 11:
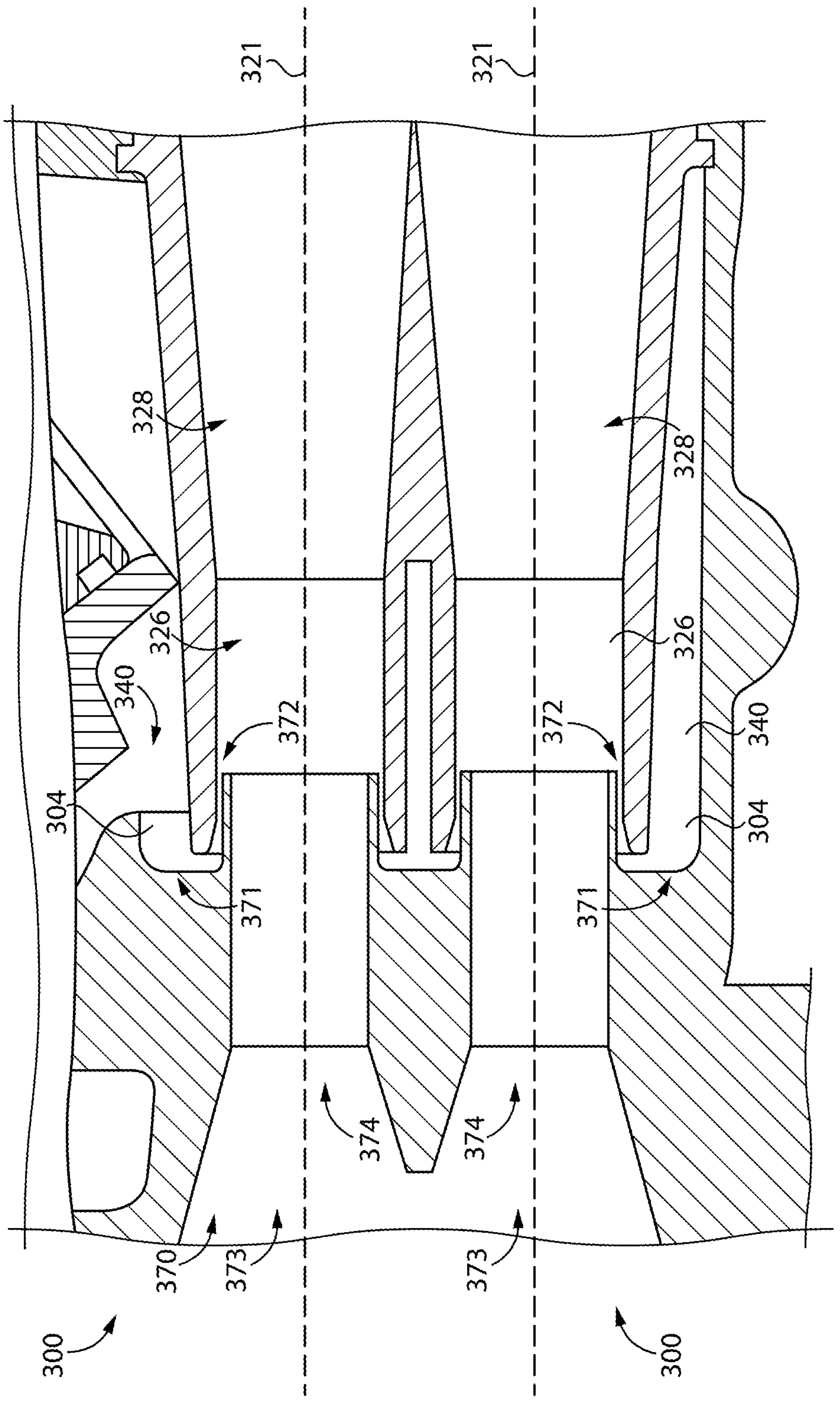
FIG. 11 is a cross-sectional illustration of a portion of the multi-barrel EGR mixer illustrated in FIG. 10.

With additional reference to FIGS. 10 and 11, illustrated therein is an EGR module 300 according to certain embodiments. The EGR module 300 may, for example, be utilized as the EGR mixer 120 in the engine system 100. The EGR module 300 is somewhat similar to the above-described EGR module 200, and similar reference characters are used to denote similar elements and features. For example, the illustrated EGR module 300 generally includes a case 310, a mixing tube 320, an EGR intake 330, an EGR nozzle 340, an air intake 350, and at least one multi-path nozzle 370, which respectively correspond to the case 210, mixing tube 220, EGR intake 230, EGR nozzle 240, air intake 250, and multi-path nozzle 270 described above. While not specifically illustrated in FIGS. 10 and 11, it should be appreciated that the EGR module 300 may be provided with a fuel injection nozzle upstream of the multi-path nozzles 370 in a manner analogous to that described above. In the interest of conciseness, the following description of the EGR module 300 focuses primarily on features that differ from those described above with reference to the EGR module 200.

Unlike the EGR module 200, in which the mixing tube 220 defines a single mixing passage 222, the EGR module 300 includes a plurality of mixing passages 322, each having a corresponding and respective throat 326 that extends along a corresponding and respective longitudinal axis 321. The EGR module 300 also includes a plurality of multi-path nozzles 370, each of which includes an outer nozzle 371 and an inner nozzle 373, at least a portion of which is surrounded by the outer nozzle 371. Moreover, each inner nozzle 373 extends into the throat 326 of a corresponding mixing passage 322.

In the illustrated form, the EGR module 300 defines a substantially annular outer passage 304 that extends about the throats 326 of the plural mixing passages 322. The outer passage 304 fluidically connects one fluid intake to the outer nozzles 371 such that the corresponding fluid flows to the outer nozzles 371 via the outer passage 304. In the illustrated form, the outer nozzles 371 are fluidically connected with the EGR intake 330, and the inner nozzles 373 are fluidically connected with the air intake 350. It is also contemplated that this arrangement may be reversed such that the outer nozzles 371 are fluidically connected with the air intake, and the inner nozzles 373 are fluidically connected with the EGR intake.

The functioning of the EGR module 300 proceeds substantially as described above with reference to the EGR module 200. However, it has been found that providing multiple mixing passages 322 can maintain suction and pressure recovery in a manner similar to that described with reference to the EGR module 200 in shorter distances along the longitudinal direction, thereby providing for savings in space.

Figure 12:
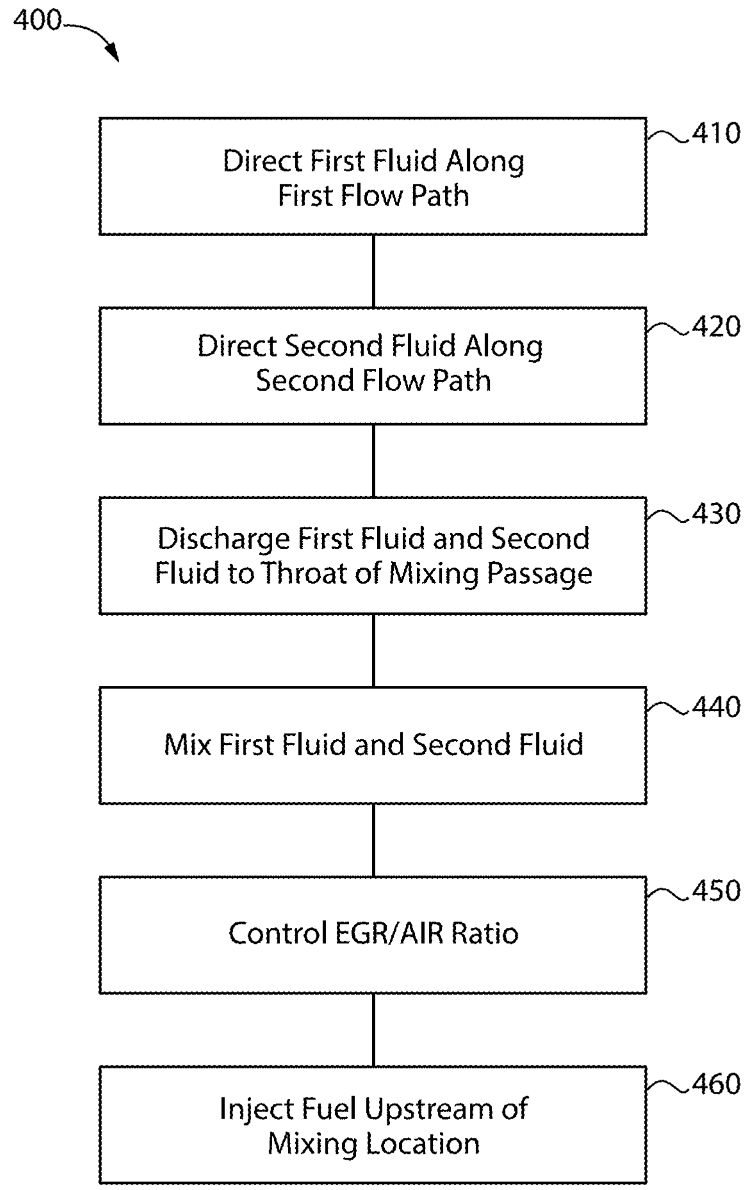
FIG. 12 is a schematic flow diagram of a process according to certain embodiments.

With additional reference to FIG. 12, an exemplary process 400 that may be performed using the system 100 is illustrated. Blocks illustrated for the processes in the present application are understood to be examples only, and blocks may be combined or divided, and added or removed, as well as re-ordered in whole or in part, unless explicitly stated to the contrary. Unless specified to the contrary, it is contemplated that certain blocks performed in the process 400 may be performed wholly by a single component of the system 100, or that the blocks may be distributed among one or more of the elements and/or additional devices or systems that are not specifically illustrated in FIGS. 1-10. Additionally, while the blocks are illustrated in a relatively serial fashion, it is to be understood that two or more of the blocks may be performed concurrently or in parallel with one another. Moreover, while the process 400 is described herein with specific reference to the EGR module 200 illustrated in FIGS. 2-9, it is to be appreciated that the process 400 may be performed with EGR mixers having additional and/or alternative features, such as the EGR module 300 illustrated in FIGS. 10 and 11.

The process 400 includes block 410, which generally involves directing a first fluid along a first flow path. In the illustrated embodiment, block 410 involves directing air 94 along the outer flow path 272. The process 400 also includes block 420, which generally involves directing a second fluid along a second flow path. In the illustrated embodiment, block 410 involves directing exhaust gas 92 along the inner flow path 274.

In certain embodiments, the second flow path may be nested within the first flow path. For example, the illustrated multi-path nozzle 270 includes an outer flow path 272 and an inner flow path 274 nested within the outer flow path 272. In certain forms, the outer flow path 272 and the inner flow path 274 may be substantially concentric. For example, an offset distance d247 between the center 247 of the second flow path 274 and the longitudinal axis 221 defining the center of the first flow path 272 may be less than 15% the throat diameter d226, less than 10% the throat diameter d226, or less than 5% of the throat diameter d226. In certain embodiments, the outer flow path 272 and the inner flow path 274 may be concentric such that the offset distance d247 is zero.

In the illustrated form, block 410 involves directing a first fluid comprising air 94 along the outer flow path 272, and block 420 involves directing a second fluid comprising exhaust gas 92 along the inner flow path 274. It is also contemplated that this arrangement may be reversed, such that block 410 involves directing air 94 along the inner flow path 272, and block 420 involves directing exhaust gas 92 along the outer flow path 274. Moreover, it should be appreciated that in certain embodiments, the first fluid may instead comprise exhaust gas 92, and the second fluid may comprise air 94.

The process 400 may include block 430, which generally involves discharging the first fluid and the second fluid to a throat of a mixing passage. For example, block 430 may involve discharging a first flow 272' comprising exhaust gas 92 and a second flow 274' comprising air 94 from the two flow paths 272, 274 of the multi-path nozzle 270 into the throat 226 of the passage 222. In certain embodiments, the first flow 272' and the second flow 274' are at least substantially parallel. For example, the first flow 272' and the second flow 274' may be in directions that are angularly offset from one another by less than 10°, by less than 7.5°, by less than 5°, or by less than 2.5°. It has been found that in providing the flows 272', 274' with discharge directions that are at least substantially parallel may aid in preserving the momentum of the two flows as they flow through the passage 222.

In certain embodiments, the process 400 may involve controlling an exit velocity ratio of the two flows 272', 274'. For example, the process 400 may involve controlling the throttles and/or valves of the system 100 to provide the first flow 272' with a first exit velocity v272' while providing the second flow 274' with a second exit velocity v274'. In certain embodiments, the process 400 may involve controlling the exit velocities v272', v274' such that a ratio of the exhaust gas exit velocity v92 to the air exit velocity v94 falls within the range of 0.7 to 2 (i.e., $0.7 \leq v92/v94 \leq 2$).

The process 400 may include block 440, which generally involves mixing the first fluid and the second fluid to thereby provide a mixture. For example, block 440 may involve mixing the exhaust gas 92 and air 94 within the throat 226 of the mixing passage 222 to thereby provide the mixture 98.

The process 400 may include block 450, which generally involves expanding the mixture 98. In the illustrated form, block 450 may be performed by the diverging portion 228 of the mixing passage 222, which is sized and shaped to reduce the velocity of the mixture 98 while causing a corresponding increase in static pressure.

The process 400 may include block 460, which generally involves controlling the EGR/AIR ratio of the mixture. For example, block 460 may involve operating one or more valves and/or throttles to thereby adjust the EGR/AIR ratio. In the illustrated form, block 460 involves controlling the EGR/AIR ratio based upon an operating speed of the engine 110. For example, block 460 may involve increasing the EGR/AIR ratio in response to an increase in the operating speed. In certain forms, block 460 may involve providing the mixture 98 with a first EGR/AIR ratio (e.g., in the range of 10-15%) when the engine 110 is operating at peak torque, and providing the mixture 98 with a greater second EGR/AIR ratio (e.g., of 20% or higher) when the engine 110 is operating at peak power.

In certain embodiments, the process 400 may include block 470, which generally involves injecting fuel upstream of the mixing location. In the illustrated form, block 470 involves injecting fuel 96 into the chamber 212 upstream of the multi-path nozzle 270. In certain embodiments, block 470 may involve injecting the fuel 96 in a direction at least substantially parallel to the mixing tube longitudinal axis 221. In certain embodiments, block 470 may involve injecting the fuel 96 with an offset distance d263 relative to the mixing tube longitudinal axis. In certain forms, block 470 may involve entraining the fuel 96 in the first fluid. In certain embodiments, the fuel-entrained first fluid may surround the inner nozzle 274, for example by forming a substantially annular flow about the inner nozzle 274.

Figure 13:
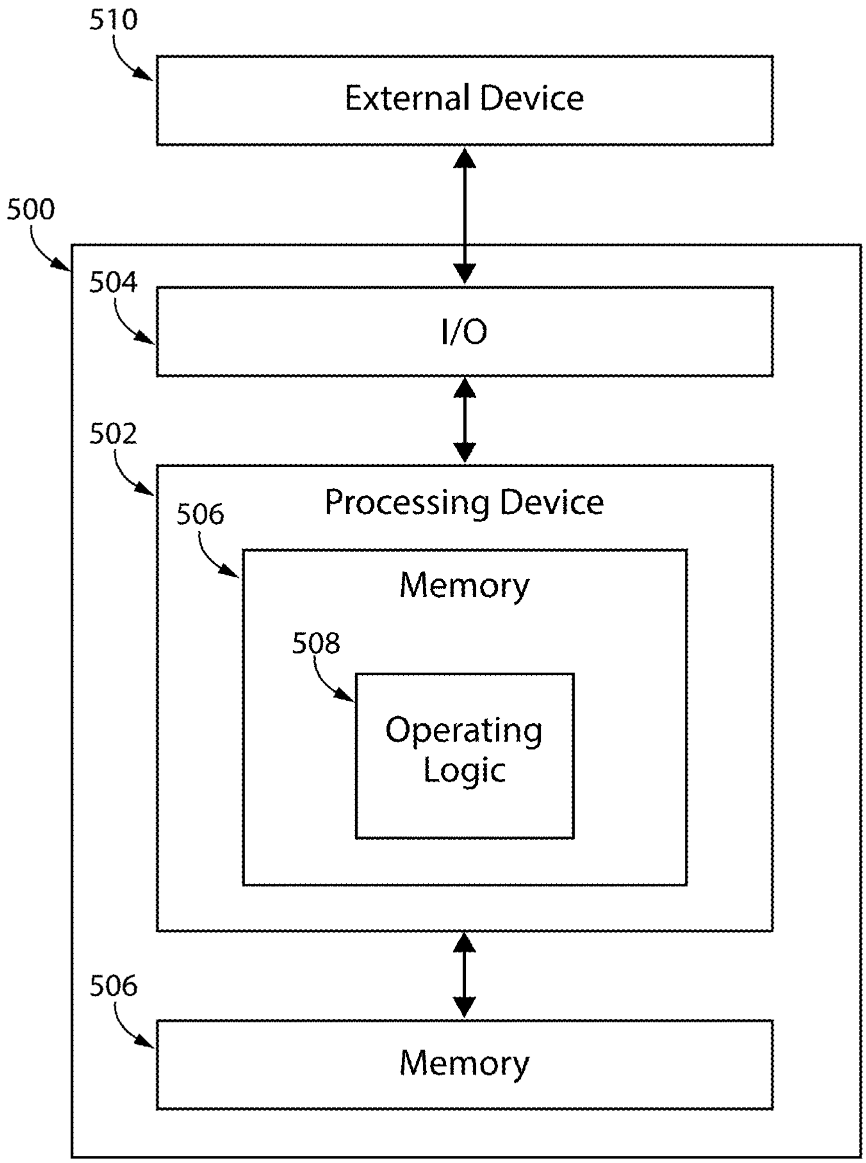
FIG. 13 is a schematic representation of a computing device that may be utilized in connection with certain embodiments.
Figure 14:
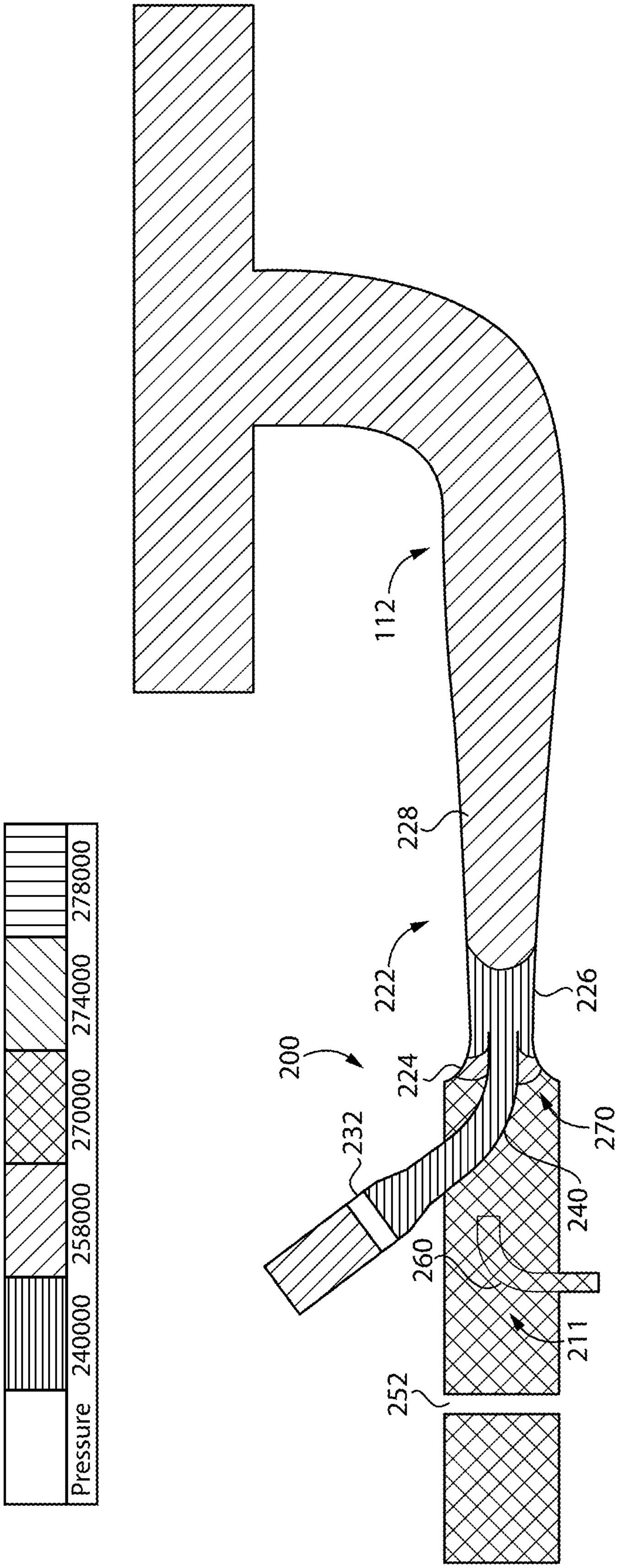
FIG. 14 illustrates pressure distribution within a portion of the engine system illustrated in FIG. 1 when the engine is operating at peak torque and low air flow.
Figure 15:
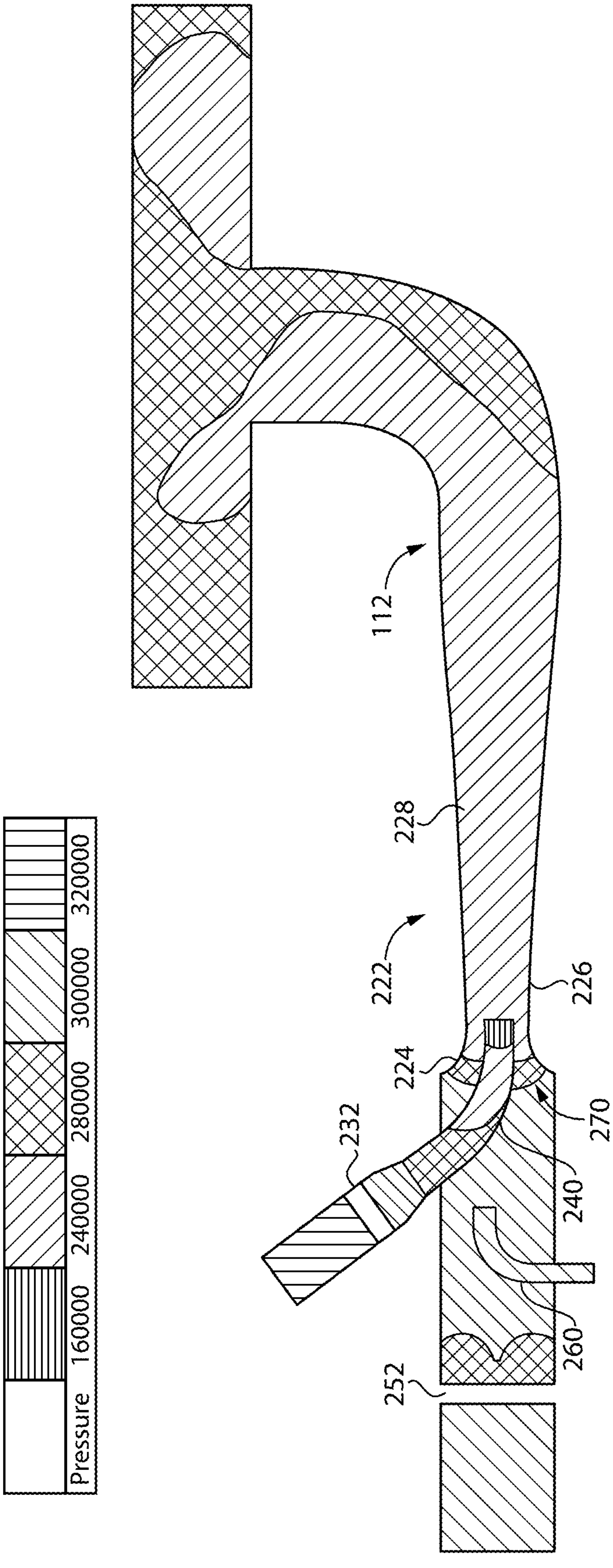
FIG. 15 illustrates pressure distribution within the portion of the engine system illustrated in FIG. 1 when the engine is operating at peak power and high air flow.

Referring now to FIG. 13, a simplified block diagram of at least one embodiment of a computing device 500 is shown. The illustrative computing device 500 depicts at least one embodiment of a controller that may be utilized in connection with the controller 150 illustrated in FIG. 1.

Depending on the particular embodiment, the computing device 500 may be embodied as a server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, electronic control unit, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, Fire Wire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the engine 110, the EGR throttle 123, the air throttle 125, the fuel pump 126, the EGR throttle actuator 234, or the air throttle actuator 254. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 12, it should be appreciated that a particular computing device 500 may include multiple processing devices 502, I/O devices 504, and/or memories 506 in other embodiments. Further, in some embodiments, more than one external device 510 may be in communication with the computing device 500.

Figure 17:
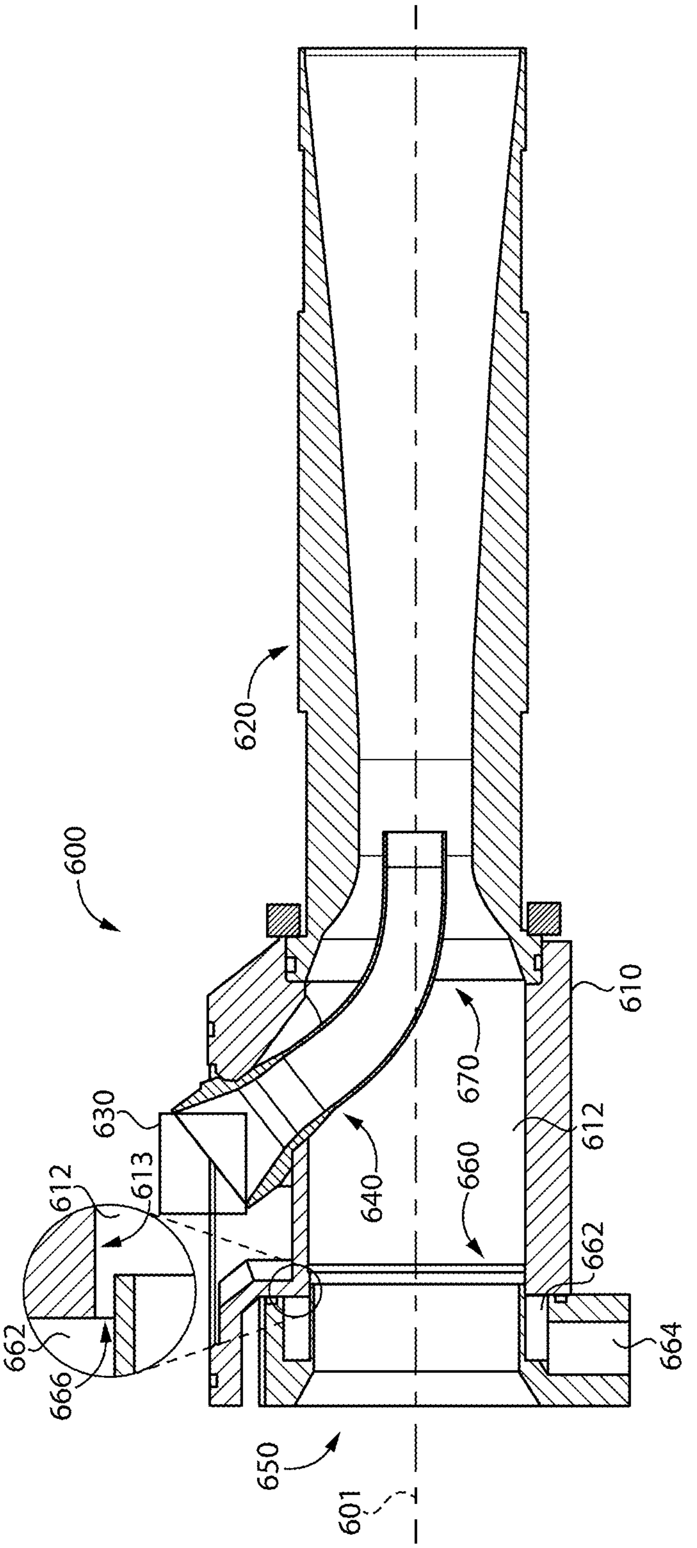
FIG. 17 is a cross-sectional illustration of an EGR mixer including a peripheral fuel injector according to certain embodiments.

With additional reference to FIG. 17, illustrated therein is an EGR module 600 according to certain embodiments. The EGR module is substantially similar to the EGR module 200 described above with reference to FIGS. 2-9, and similar reference characters are used to indicate similar elements and features. For example, the EGR module 600 generally includes a case 610, a mixing tube 620, an EGR intake 630, an EGR nozzle 640, an air intake 650, a fuel nozzle 660, and a multipath nozzle 670, which respectively correspond to the above-described case 210, mixing tube 220, EGR intake 230, EGR nozzle 240, air intake 250, fuel nozzle 260, and multipath nozzle 270. In the interest of conciseness, the following description of the EGR module 600 focuses primarily on features that are different from those described above with reference to the EGR module 200.

As with the above-described fuel nozzle 260, the fuel nozzle 660 of the illustrated EGR mixer 600 is positioned upstream of the multipath nozzle 670. However, the fuel nozzle 660 of the current embodiment is a provided as a peripheral fuel nozzle configured to inject fuel along the periphery 613 of the chamber 612. The fuel nozzle 660 includes an annular manifold 662 that receives fuel from a fuel inlet 664 and directs the fuel to an elongated outlet slot 666 that extends about the periphery 613 of the chamber 612. For example, in embodiments in which the chamber 612 has a circular cross-section, the outlet slot 666 may be annular. The outlet slot 666 may be considered to define an outlet portion of the fuel nozzle 660. It has been found that in creating a peripheral injection of fuel into the chamber 612, mixing of the fuel, exhaust gas, and air may be facilitated and/or improved.

Figure 18:
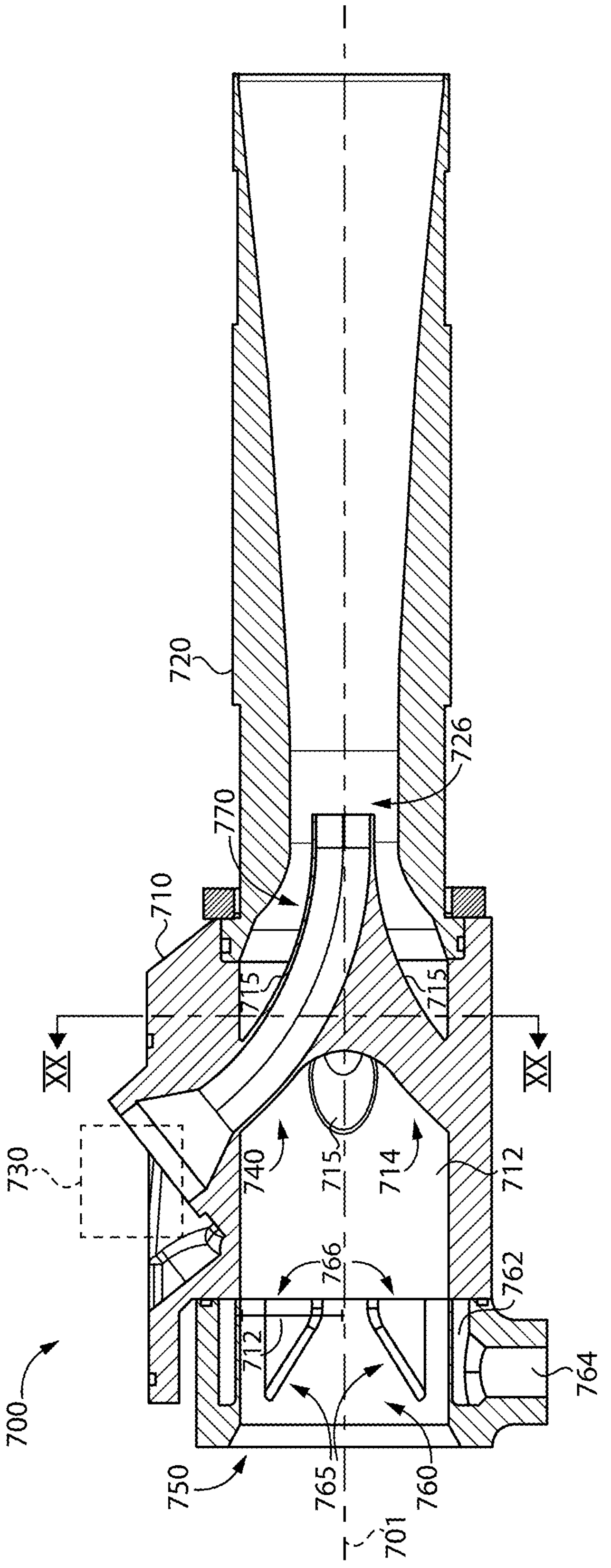
FIG. 18 is a cross-sectional illustration of an EGR mixer according to certain embodiments, the EGR mixer including a flow director and a fuel nozzle including fins.
Figure 19:
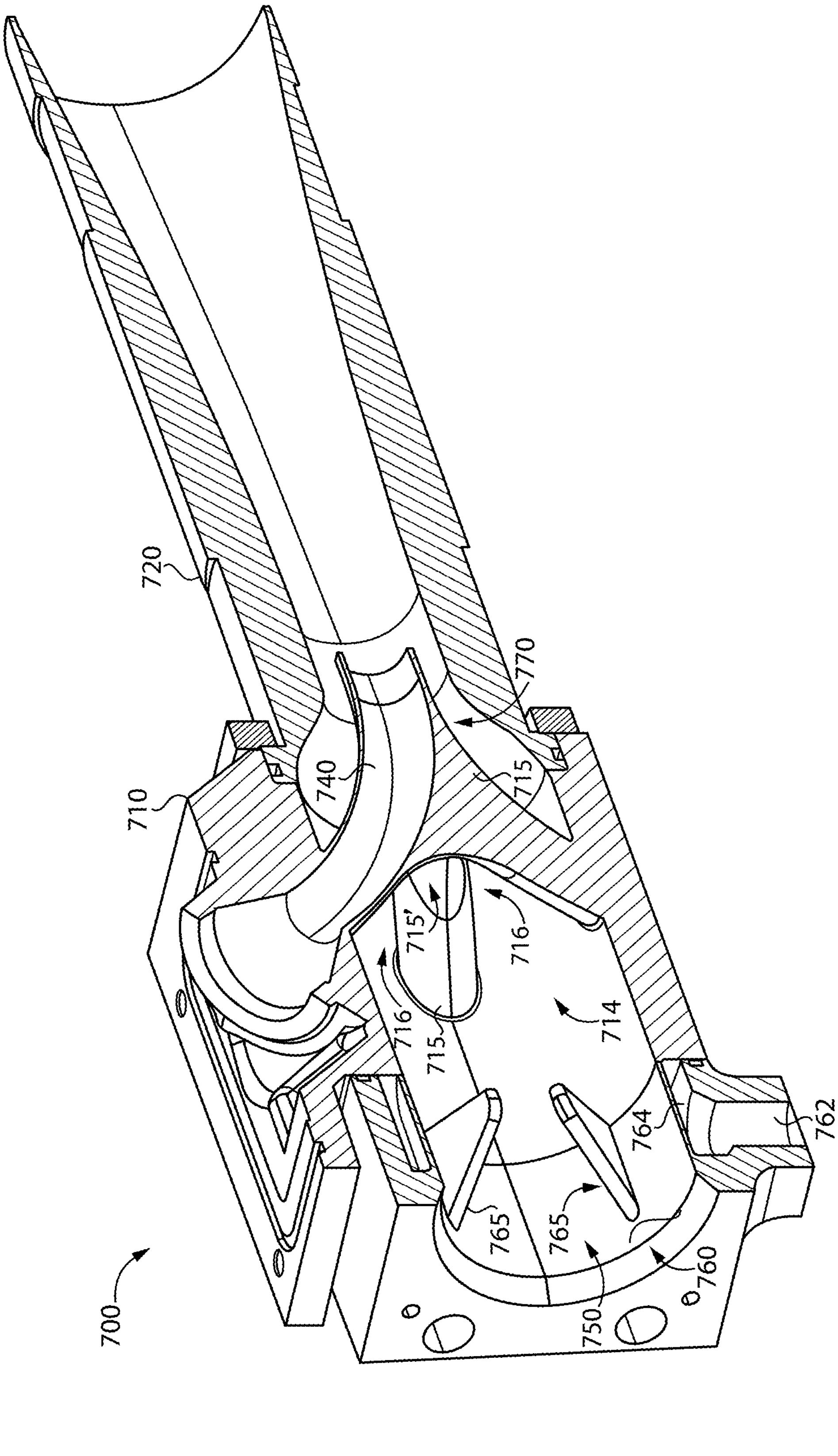
FIG. 19 is a perspective cutaway illustration of the EGR mixer illustrated in FIG. 18.
Figure 20:
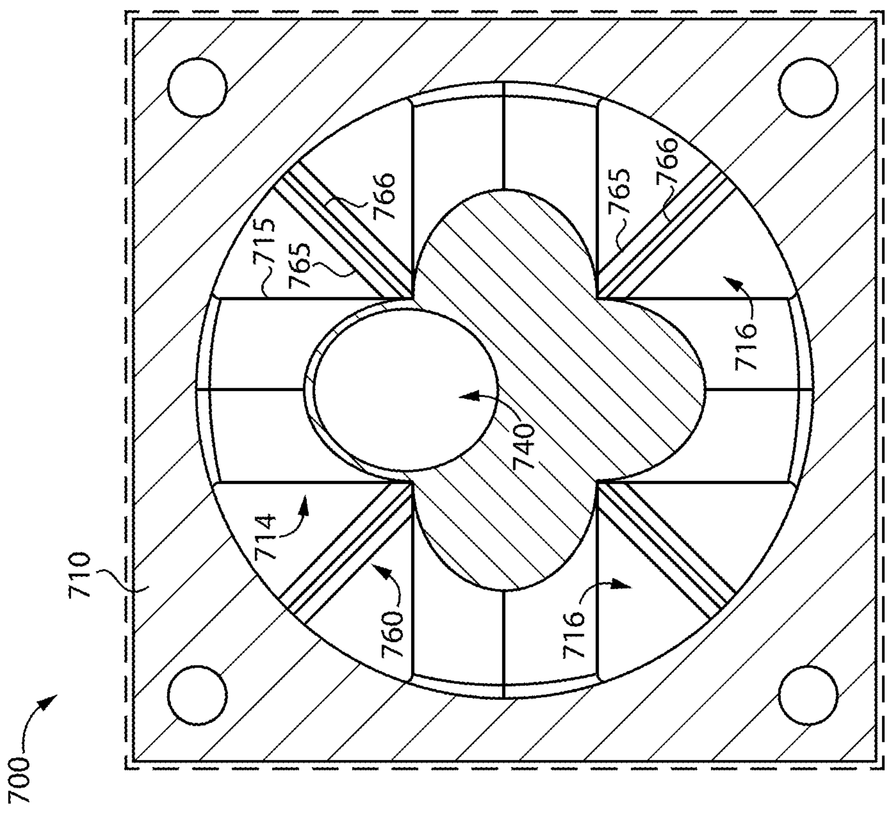
FIG. 20 is a cross-sectional illustration of the EGR mixer illustrated in FIG. 18 taken along the line XX-XX in FIG. 18.

With additional reference to FIGS. 18-20, illustrated therein is an EGR module 700 according to certain embodiments. The EGR module is substantially similar to the EGR module 200 described above with reference to FIGS. 2-9, and similar reference characters are used to indicate similar elements and features. For example, the EGR module 200 generally includes a case 710, a mixing tube 720, an EGR intake 730, an EGR nozzle 740, an air intake 750, a fuel nozzle 760, and a multipath nozzle 770, which respectively correspond to the above-described case 210, mixing tube 220, EGR intake 230, EGR nozzle 240, air intake 250, fuel nozzle 260, and multipath nozzle 270. In the interest of conciseness, the following description of the EGR module 700 focuses primarily on features that are different from those described above with reference to the EGR module 200.

In the illustrated form, the case 710 includes a flow director 714 that is positioned within the chamber 712. The flow director 714 includes a plurality of sweeping struts 715 that extend inward from the outer wall of the chamber 712, sweep forward in the downstream direction, and meet near the longitudinal axis 701 of the module 700 at a hub 715'. A plurality of gaps 716 are defined between the struts 715, and the EGR nozzle 740 extends through one of the struts 715.

Figure 21:
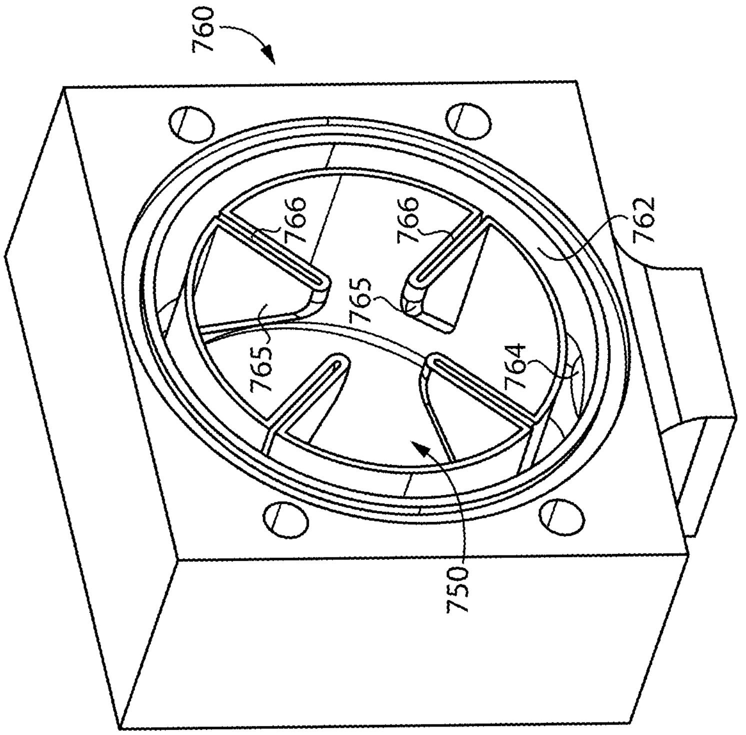
FIG. 21 is a perspective illustration of the fuel nozzle including fins.

With additional reference to FIG. 21, the fuel nozzle 760 is positioned upstream of the multipath nozzle 770, and generally includes an annular manifold 762 that receives fuel from a fuel inlet 764 and directs the fuel to a plurality of fins 765 that project radially inward from the manifold 762. Each of the fins 765 includes a corresponding outlet region 766 through which fuel is operable to flow from the fin 765 to the chamber 712. Each outlet region 766 extends along at least a portion of a radial length of the fin 765, and in the illustrated form is provided in the form of an elongated slot. It is also contemplated that one or more of the outlet regions 766 may be provided in another form, such as a series of apertures. In certain forms, the outlet region 766 may extend at least 50% a radial length of the fin 765, at least 75% a radial length of the fin 765, or along substantially an entire radial length of the fin 765.

As illustrated in FIG. 20, each of the fins 765 is aligned with a corresponding one of the gaps 716 in the plan view of FIG. 20 such that fuel flowing out of the fins 765 has a straight path through the corresponding gap 716. Moreover, the struts 715 of the flow director 714 are configured to divert air from the air intake 750, in which the fuel becomes entrained, through the gaps 716. In the illustrated form, the fins 765 extend inward such that the radially inner ends of the fins 765 are aligned with the hub 715' in the plan view of FIG. 20. In certain forms, each fin 765 may have a radial length that is at least 50% of a radius r712 of the chamber 712 or at least 75% of the chamber radius r712.

In the illustrated form, the fuel nozzle 760 includes a plurality of fins 765, and each fin 765 includes a corresponding outlet region 766 that extends along at least a portion of the radial length of the fin 765. In certain forms, the fuel nozzle 760 may include a single fin 765. However, it has been found that providing a plurality of fins 765 may, for example, improve fuel distribution about the chamber 712 in a circumferential direction. In certain forms, the outlet region 766 may not necessarily extend along the radial length of the fin, and may instead be localized at a single point on the fin 765. However, it has been found that providing the fuel via an outlet 766 that extends along the radial direction may, for example, improve fuel distribution in the radial direction. Moreover, the gaps 716 provided by the flow director 714 may serve as bottlenecks that further promote mixing of fuel and air upstream of the throat 726 of the mixing tube 720.

Certain embodiments of the present application relate to a method of mixing exhaust gas and air in an exhaust gas recirculation mixer, the method comprising: directing exhaust gas from an engine to a mixing tube along a first flow path; and directing air to the mixing tube along a second flow path, wherein one of the first flow path or the second flow path is an outer flow path, and wherein the other of the first flow path or the second flow path is an inner flow path surrounded by the outer flow path; wherein the first flow path and the second flow path merge within a throat of the mixing tube such that the exhaust gas and the air mix within the mixing tube to thereby provide a mixture of exhaust gas and air.

In certain embodiments, the method further comprises expanding the mixture within a diffuser of the mixing tube, thereby reducing a velocity of the mixture and increasing a static pressure of the mixture.

In certain embodiments, the method further comprises directing the mixture of exhaust gas and air to the engine for combustion by the engine.

In certain embodiments, the outer flow path and the inner flow path are at least substantially concentric.

In certain embodiments, the outer flow path and the inner flow path are concentric.

In certain embodiments, a center of the outer flow path is offset from a center of the inner flow path center by an offset distance; and wherein the offset distance is less than one tenth a diameter of the outer flow path.

In certain embodiments, the method further comprises controlling an exhaust-gas-to-air (EGR/AIR) ratio of the mixture based upon an operating speed of the engine.

In certain embodiments, controlling the EGR/AIR ratio of the mixture based upon the operating speed of the engine comprises increasing the EGR/AIR ratio in response to an increase in the operating speed.

Certain embodiments of the present application relate to a method of operating an exhaust gas recirculation mixer, the method comprising: directing a first fluid along an outer flow path to a throat of a mixing passage; directing a second fluid along an inner flow path to the throat of the mixing passage, wherein the inner flow path is nested within the outer flow path and is connected with the outer flow path via a mixing passage; wherein one of the first fluid or the second fluid comprises air; wherein the other of the first fluid or the second fluid comprises exhaust gas directed to the exhaust gas recirculation mixer from an engine; and wherein the exhaust gas and the air mix within the mixing passage to thereby provide a mixture to be directed to the engine.

In certain embodiments, the method further comprises expanding the mixture within a diffuser to thereby cause a reduction in a velocity of the mixture and an increase in static pressure of the mixture.

In certain embodiments, the outer flow path and the inner flow path merge at a merge location; wherein the first fluid has a first velocity at the merge location; wherein the second fluid has a second velocity at the merge location; and wherein a ratio of the first velocity to the second velocity is in a range of 0.7 to 2.

In certain embodiments, the outer flow path and the inner flow path merge at a merge location; wherein the exhaust gas has an exhaust gas velocity at the merge location; wherein the air has an air velocity at the merge location; and wherein the method further comprises maintaining a ratio of the exhaust gas velocity to the air velocity in a range of 0.7 to 2 when the engine is operating at peak power.

In certain embodiments, the method further comprises controlling an exhaust-gas-to-air (EGR/AIR) ratio of the mixture based upon an operating speed of the engine.

In certain embodiments, controlling the EGR/AIR ratio of the mixture based upon the operating speed of the engine comprises increasing the EGR/AIR ratio in response to an increase in the operating speed.

In certain embodiments, the outer nozzle comprises a Bernoulli nozzle.

In certain embodiments, the method further comprises: discharging the first fluid from the outer flow path in a first direction; discharging the second fluid from the inner flow path in a second direction; and wherein the first direction and the second direction are at least substantially parallel.

In certain embodiments, the first direction and the second direction define an angle of less than 7.5°.

Certain embodiments of the present application relate to an exhaust gas recirculation mixer, comprising: a first fluid inlet configured to receive a first fluid, wherein the first fluid comprises one of air or exhaust gas; a second fluid inlet configured to receive a second fluid, wherein the second fluid comprises the other of air or exhaust gas; an outer nozzle fluidically connected with the first fluid inlet and configured to direct the first fluid to a throat of a mixing tube; and an inner nozzle fluidically connected with the second fluid inlet and configured to direct the second fluid to the throat of the mixing tube; wherein at least a portion of the inner nozzle is nested within the outer nozzle.

In certain embodiments, the method further comprises a diffuser downstream of the throat, wherein the diffuser is configured to reduce a velocity of the mixture and increase a static pressure of the mixture.

In certain embodiments, the inner nozzle extends into the throat of the mixing tube.

In certain embodiments, an outlet of the outer nozzle and an outlet of the inner nozzle are at least substantially concentric.

In certain embodiments, the outlet of the outer nozzle and the outlet of the inner nozzle are concentric.

In certain embodiments, the mixing tube extends along a longitudinal axis; wherein the inner nozzle is configured to discharge the first fluid into the throat in a discharge direction; and wherein the discharge direction is at least substantially parallel to the longitudinal axis.

In certain embodiments, the discharge direction and the longitudinal axis define an angle of less than 10°.

In certain embodiments, the discharge direction is parallel to the longitudinal axis.

A method of mixing fuel with each of a first fluid and a second fluid, the method comprising: directing a first fluid via a first flow path to a mixing passage; directing a second fluid via a second flow path to the mixing passage, wherein the first flow path surrounds the second flow path, and wherein the first flow path and the second flow path meet and mix within the mixing passage; and injecting fuel into the first fluid upstream of the mixing passage such that the injected fuel becomes entrained in the first fluid and flows around the second flow path to thereby cause mixing of the fuel-entrained first fluid with the second fluid to create a mixture within the mixing passage.

In certain embodiments, the method further comprises expanding the mixture to thereby increase a static pressure of the mixture.

In certain embodiments, injecting fuel into the first fluid comprises injecting the fuel in a direction at least substantially parallel to a longitudinal axis of the mixing passage.

In certain embodiments, the first fluid flows through a chamber upstream of the mixing passage; and wherein injecting fuel into the first fluid comprises injecting the fuel into the first fluid via a fuel nozzle that projects into the chamber.

In certain embodiments, a center of an outlet of the fuel nozzle is offset from a longitudinal axis of the mixing passage by a non-zero offset dimension.

In certain embodiments, the non-zero offset dimension is less than 10% of a diameter of a throat of the mixing passage.

In certain embodiments, the non-zero offset dimension is at least 1% of a diameter of a throat of the mixing passage.

In certain embodiments, the first fluid has a first fluid bulk velocity within the chamber; wherein the fuel is injected into the first fluid with a fuel bulk velocity; and wherein the fuel bulk velocity is at least 40% of the first fluid bulk velocity.

In certain embodiments, the first fluid comprises one of air or exhaust gas; and wherein the second fluid comprises the other of air or exhaust gas.

In certain embodiments, the first fluid flows through a chamber upstream of the mixing passage; and wherein injecting fuel into the first fluid comprises injecting the fuel into the first fluid via a fuel nozzle having an outlet that extends along a periphery of the chamber.

In certain embodiments, injecting fuel into the first fluid comprises injecting the fuel into the first fluid via a fuel nozzle comprising a plurality of fins, each having a corresponding outlet region.

In certain embodiments, each outlet region extends along at least a portion of a length of the corresponding fin.

Certain embodiments of the present application relate to an exhaust gas recirculation mixer, comprising: a chamber through which a first fluid is operable to flow in a downstream direction toward a mixing passage, wherein the chamber is fluidically connected with the mixing passage via a first nozzle, and wherein the mixing passage extends along a longitudinal axis defining the downstream direction and an upstream direction opposite the downstream direction; a second nozzle extending into the mixing passage and configured to direct a second fluid toward the mixing passage, wherein the second nozzle comprises a second nozzle outlet portion circumferentially surrounded by the first nozzle; and a fuel nozzle operable to direct fuel into the chamber, the fuel nozzle comprising a fuel nozzle outlet portion configured to inject fuel into the chamber in a fuel injection direction, wherein the fuel nozzle outlet portion is positioned upstream of the first nozzle.

In certain embodiments, the exhaust gas recirculation mixer further comprises a diffuser downstream of the throat, wherein the diffuser is configured to increase a static pressure of fluid flowing through the diffuser in the downstream direction.

In certain embodiments, the fuel nozzle outlet portion has a center that is offset from the longitudinal axis by a non-zero offset dimension.

In certain embodiments, the non-zero offset dimension is less than 10% of a diameter of a throat of the mixing passage.

In certain embodiments, the non-zero offset dimension is at least 1% of a diameter of a throat of the mixing passage.

In certain embodiments, the fuel injection direction is at least substantially parallel to the longitudinal axis.

In certain embodiments, an angle defined between the fuel injection direction and the longitudinal axis is less than 5°.

In certain embodiments, the fuel nozzle outlet portion comprises a slot extending along a periphery of the chamber.

In certain embodiments, the fuel nozzle comprises a plurality of radially-extending fins; and wherein the fuel nozzle outlet portion comprises a plurality of outlet regions, each outlet region extending along a corresponding one of the fins.

In certain embodiments, the exhaust gas recirculation mixer further comprises a flow director comprising a plurality of struts; wherein one of the struts at least partially defines the second nozzle.

Certain embodiments of the present application relate to an exhaust gas recirculation mixer, comprising: a chamber through which a first fluid is operable to flow in a downstream direction toward a mixing passage, wherein the chamber is fluidically connected with the mixing passage via a first nozzle, and wherein the mixing passage extends along a longitudinal axis defining the downstream direction and an upstream direction opposite the downstream direction; a second nozzle extending into the mixing passage and configured to direct a second fluid toward the mixing passage, wherein the second nozzle comprises a second nozzle outlet portion circumferentially surrounded by the first nozzle; and a fuel nozzle operable to direct fuel into the chamber upstream of the first nozzle, wherein the fuel nozzle comprises an elongated outlet slot.

In certain embodiments, the elongated outlet slot extends along a periphery of the chamber.

In certain embodiments, the chamber has a circular cross-section; and wherein the elongated outlet slot is annular.

In certain embodiments, the elongated outlet slot conforms to the periphery of the chamber.

In certain embodiments, the elongated outlet slot extends along an entirety of the periphery of the chamber.

In certain embodiments, the fuel nozzle further comprises a fin that projects radially inward into the chamber, and wherein the elongated outlet slot is formed in the fin.

In certain embodiments, the exhaust gas recirculation mixer further comprises a flow director comprising a plurality of struts having gaps defined therebetween; wherein the fin is aligned with one of the gaps.

In certain embodiments, the second nozzle is defined by the flow director and includes a flow path extending through one of the struts.

Certain embodiments of the present application relate to an exhaust gas recirculation mixer operable to receive a first fluid via a first fluid intake and to receive a second fluid via a second fluid intake, wherein one of the first fluid or the second fluid comprises air, and wherein the other of the first fluid or the second fluid comprises exhaust gas, the exhaust gas recirculation mixer comprising: a plurality of mixing passages, each mixing passage comprising a corresponding and respective throat; a plurality of multi-path nozzles, each multi-path nozzle comprising: an outer nozzle fluidically connected to the first fluid intake; and an inner nozzle fluidically connected to the second fluid intake, wherein the inner nozzle is nested within the outer nozzle and projects into the throat of a corresponding and respective mixing passage.

In certain embodiments, the exhaust gas recirculation mixer further comprises at least one diffuser positioned downstream of the throats and configured to increase static pressure of fluid flowing therethrough.

In certain embodiments, for each multi-path nozzle, the inner nozzle and the outer nozzle are substantially concentric.

In certain embodiments, one of the first fluid intake or the second fluid intake is an air intake; and wherein each of the nozzles fluidically connected with the air intake comprises a Bernoulli nozzle.

In certain embodiments, the exhaust gas recirculation mixer further comprises at least one intake valve operable to control flow of the second fluid to the inner nozzles.

In certain embodiments, the at least one intake valve is a single intake valve.

In certain embodiments, the at least one intake valve comprises at least one butterfly valve.

In certain embodiments, the exhaust gas recirculation mixer further comprises an outer passage circumferentially surrounding the throats of the plurality of mixing passages, the outer passage fluidically connecting the outer nozzles to the first fluid intake.

Certain embodiments of the present application relate to a method of mixing exhaust gas and air in an exhaust gas recirculation mixer, the method comprising: directing a first fluid to each of a plurality of mixing tubes along a plurality of first flow paths, wherein the first fluid comprises one of air or exhaust gas; and directing a second fluid to each of the plurality of mixing tubes along a plurality of second flow paths, wherein the second fluid comprises the other of air or exhaust gas; wherein each of the mixing tubes comprises a throat in which a corresponding one of the first flow paths merges with a corresponding one of the second flow paths such that the air and the exhaust gas mix within the mixing tubes to thereby provide a mixture of exhaust gas and air.

In certain embodiments, the method further comprises expanding the mixture within one or more diffusers to thereby reduce a velocity of the mixture and increase a static pressure of the mixture.

In certain embodiments, each mixing tube comprises a corresponding and respective diffuser; and wherein the method further comprises: expanding the mixture in the diffusers to thereby reduce a velocity of the mixture and increase a static pressure of the mixture; and merging diffused mixture streams downstream of the diffusers.

In certain embodiments, the exhaust gas recirculation mixer comprises a plurality of multi-path nozzles; and wherein each multi-path nozzle defines a corresponding one of the first flow paths and a corresponding one of the second flow paths.

In certain embodiments, the exhaust gas recirculation mixer comprises a plurality of multi-path nozzles, each multi-path nozzle comprising: an outer nozzle defining a corresponding one of the first flow paths; and an inner nozzle nested within the outer nozzle and defining a corresponding one of the second flow paths.

In certain embodiments, for one or more of the multi-path nozzles, the inner nozzle and the outer nozzle are at least substantially concentric.

In certain embodiments, the method further comprises directing a fluid to the outer nozzles via an outer passage that circumferentially surrounds one or more of the throats.

An exhaust gas recirculation mixer operable to receive a first fluid via a first fluid intake and to receive a second fluid via a second fluid intake, wherein one of the first fluid or the second fluid comprises air, and wherein the other of the first fluid or the second fluid comprises exhaust gas, the exhaust gas recirculation mixer comprising: a plurality of mixing passages, each comprising a corresponding and respective throat; a plurality of outer nozzles, each of the outer nozzles leading to the throat of a corresponding one of the mixing passages; an outer passage surrounding one or more of the throats and connecting the first fluid intake with a corresponding one of the outer nozzles; and a plurality of inner nozzles connected with the second fluid intake, wherein each of the inner nozzles extends into a corresponding one of the throats via a corresponding one of the outer nozzles.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exhaust gas recirculation mixer operable to receive a first fluid via a first fluid intake and to receive a second fluid via a second fluid intake, wherein one of the first fluid or the second fluid comprises air, and wherein the other of the first fluid or the second fluid comprises exhaust gas, the exhaust gas recirculation mixer comprising:

a plurality of mixing passages, each mixing passage comprising a corresponding and respective throat, each throat having a constant diameter along a length thereof, a plurality of multi-path nozzles, each multi-path nozzle comprising:

an outer nozzle fluidically connected to the first fluid intake; and an inner nozzle fluidically connected to the second fluid intake, wherein the inner nozzle is nested within the outer nozzle and projects into the throat of a corresponding and respective mixing passage.

2. The exhaust gas recirculation mixer of claim 1, further comprising at least one diffuser positioned downstream of the throats and configured to increase static pressure of fluid flowing therethrough.

3. The exhaust gas recirculation mixer of claim 1, wherein, for each multi-path nozzle, the inner nozzle and the outer nozzle are substantially concentric.

4. The exhaust gas recirculation mixer of claim 1, wherein one of the first fluid intake or the second fluid intake is an air intake; and wherein each of the nozzles fluidically connected with the air intake comprises a Bernoulli nozzle.

5. The exhaust gas recirculation mixer of claim 1, further comprising at least one intake valve operable to control flow of the second fluid to the inner nozzles.

6. The exhaust gas recirculation mixer of claim 5, wherein the at least one intake valve is a single intake valve.

7. The exhaust gas recirculation mixer of claim 5, wherein the at least one intake valve comprises at least one butterfly valve.

8. The exhaust gas recirculation mixer of claim 1, further comprising an outer passage circumferentially surrounding the throats of the plurality of mixing passages, the outer passage fluidically connecting the outer nozzles to the first fluid intake.

9. The exhaust gas recirculation mixer of claim 1, wherein the constant diameter of the throat is a minimum diameter of the corresponding mixing passage.

10. A method of mixing exhaust gas and air in an exhaust gas recirculation mixer, the method comprising:

directing a first fluid to each of a plurality of mixing tubes along a plurality of first flow paths, wherein the first fluid comprises one of air or exhaust gas; and directing a second fluid to each of the plurality of mixing tubes along a plurality of second flow paths, wherein the second fluid comprises the other of air or exhaust gas;

wherein each of the mixing tubes comprises a throat in which a corresponding one of the first flow paths merges with a corresponding one of the second flow paths such that the air and the exhaust gas mix within the mixing tubes to thereby provide a mixture of exhaust gas and air; and wherein each throat has a constant diameter along a length thereof.

11. The method of claim 10, further comprising expanding the mixture within one or more diffusers to thereby reduce a velocity of the mixture and increase a static pressure of the mixture.

12. The method of claim 10, wherein each mixing tube comprises a corresponding and respective diffuser; and wherein the method further comprises:

expanding the mixture in the diffusers to thereby reduce a velocity of the mixture and increase a static pressure of the mixture; and merging diffused mixture streams downstream of the diffusers.

13. The method of claim 10, wherein the exhaust gas recirculation mixer comprises a plurality of multi-path nozzles; and wherein each multi-path nozzle defines a corresponding one of the first flow paths and a corresponding one of the second flow paths.

14. The method of claim 10, wherein the exhaust gas recirculation mixer comprises a plurality of multi-path nozzles, each multi-path nozzle comprising:

an outer nozzle defining a corresponding one of the first flow paths; and an inner nozzle nested within the outer nozzle and defining a corresponding one of the second flow paths.

15. The method of claim 14, wherein, for one or more of the multi-path nozzles, the inner nozzle and the outer nozzle are at least substantially concentric.

16. The method of claim 14, further comprising directing a fluid to the outer nozzles via an outer passage that circumferentially surrounds one or more of the throats.

17. The method of claim 10, wherein each throat defines a minimum diameter of the corresponding mixing tube.

18. The method of claim 10, wherein each of the first flow paths merges with the corresponding one of the second flow paths at a respective merge location at which the exhaust gas has an exhaust gas velocity and the air has an air velocity; and wherein the method further comprises maintaining an EGR/AIR ratio of the exhaust gas velocity to the air velocity in a range of 0.7 to 2.0.

19. An exhaust gas recirculation mixer operable to receive a first fluid via a first fluid intake and to receive a second fluid via a second fluid intake, wherein one of the first fluid or the second fluid comprises air, and wherein the other of the first fluid or the second fluid comprises exhaust gas, the exhaust gas recirculation mixer comprising:

a plurality of mixing passages, each comprising a corresponding and respective throat, wherein each throat is defined as a constant-diameter section of the corresponding mixing passage;

a plurality of outer nozzles, each of the outer nozzles leading to the throat of a corresponding one of the mixing passages;

an outer passage surrounding one or more of the throats and connecting the first fluid intake with a corresponding one of the outer nozzles; and a plurality of inner nozzles connected with the second fluid intake, wherein each of the inner nozzles extends into a corresponding one of the throats via a corresponding one of the outer nozzles.

20. The exhaust gas recirculation mixer of claim 19, wherein each a minimum diameter of each mixing passage is defined at the throat of the mixing passage.

* * * * *